(12) United States Patent
Xu et al.

(10) Patent No.: US 12,273,251 B2
(45) Date of Patent: Apr. 8, 2025

(54) DATA ANALYSIS APPARATUS MANAGEMENT AND CONTROL METHOD AND COMMUNICATION APPARATUS

(71) Applicant: Huawei Technologies Co., Ltd., Shenzhen (CN)

(72) Inventors: Ruiyue Xu, Shanghai (CN); Lan Zou, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/351,717

(22) Filed: Jul. 13, 2023

(65) Prior Publication Data

US 2023/0403223 A1    Dec. 14, 2023

Related U.S. Application Data

(63) Continuation of application No. PCT/CN2022/070366, filed on Jan. 5, 2022.

(30) Foreign Application Priority Data

Jan. 14, 2021 (CN) .......... 202110048787.9

(51) Int. Cl.
*H04L 43/0876* (2022.01)
*H04L 41/147* (2022.01)

(52) U.S. Cl.
CPC ........ *H04L 43/0876* (2013.01); *H04L 41/147* (2013.01)

(58) Field of Classification Search
CPC .......... H04L 43/0876; H04L 41/147
See application file for complete search history.

(56) References Cited

U.S. PATENT DOCUMENTS

| 2018/0262924 | A1* | 9/2018 | Dao ............... H04W 24/08 |
| 2019/0394655 | A1* | 12/2019 | Rahman ........... H04L 41/142 |
| 2020/0401945 | A1 | 12/2020 | Xu et al. |

FOREIGN PATENT DOCUMENTS

CN    106155990 A    11/2016

OTHER PUBLICATIONS

3rd Generation Partnership Project; Technical Specification Group Services and System Aspects; System architecture for the 5G System (5GS); Stage 2 (Release 16), 3GPP TS 23.501 V16.7.0 (Dec. 2020), total 450 pages.

3rd Generation Partnership Project; Technical Specification Group Services and System Aspects; Architecture enhancements for 5G System (5GS) to support network data analytics services (Release 16), 3GPP TS 23.288 V16.6.0 (Dec. 2020), total 67 pages.

* cited by examiner

*Primary Examiner* — June Sison
(74) *Attorney, Agent, or Firm* — Slater Matsil, LLP

(57) ABSTRACT

A method includes: A first management apparatus determines configuration information of a data analysis apparatus, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The first management apparatus sends the configuration information.

19 Claims, 7 Drawing Sheets

DATA ANALYSIS APPARATUS MANAGEMENT AND CONTROL METHOD AND COMMUNICATION APPARATUS

CROSS-REFERENCE TO RELATED APPLICATIONS

This application is a continuation of International Application No. PCT/CN2022/070366, filed on Jan. 5, 2022, which claims priority to Chinese Patent Application No. 202110048787.9, filed on Jan. 14, 2021. The disclosures of the aforementioned applications are hereby incorporated by reference in their entireties.

TECHNICAL FIELD

This application relates to the communication field, and in particular, to a management and control method for a data analysis apparatus and a communication apparatus.

BACKGROUND

Currently, an operator network has developed into a fifth generation (5G) mobile communication technology, and a network architecture has become more complex. Correspondingly, operation and maintenance services for the operator network need to be improved. Generally, for network operation and maintenance, network data of devices in a network architecture needs to be analyzed, to implement operation and maintenance services such as network planning, network deployment, and network optimization through data analysis. However, in 5G, with the increase of terminal devices and the diversification of 5G services, a quantity of devices accessing a network increases, and it is more difficult to analyze data of the devices, bringing challenges for network operation and maintenance. How to reduce difficulties in network operation and maintenance is a problem to be considered.

SUMMARY

This application provides a management and control method for a data analysis apparatus and a communication apparatus, to reduce difficulties in network operation and maintenance to some extent.

According to a first aspect, a management and control method for a data analysis apparatus is provided, applied to a first management apparatus. The method includes: The first management apparatus determines configuration information of a data analysis apparatus. The configuration information is used to configure a data analysis function of the data analysis apparatus. For example, the configuration information includes at least one of state information and prediction capability information. The state information is used to activate or de-activate the data analysis function of the data analysis apparatus. The prediction capability information is used to configure a data prediction and analysis capability of the data analysis apparatus. The first management apparatus sends the configuration information.

In other words, according to the management and control method for a data analysis apparatus provided in this application, the data analysis apparatus may be flexibly managed and controlled. For example, the data analysis function of the data analysis apparatus may be configured, and/or the data prediction and analysis capability of the data analysis apparatus may be configured. When the management and control solution for a data analysis apparatus is applicable to a network operation and maintenance scenario, data analysis of a device (e.g., the data analysis apparatus) in a network architecture may be managed and controlled, to reduce difficulties in the network operation and maintenance scenario and improve network operation and maintenance scenario.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

To be specific, the first management apparatus may configure the data analysis apparatus to analyze data within a specific scope, obtain data from a specific data source for analysis, meet a specific constraint during data analysis, and the like. In this way, the data analysis function of the data analysis apparatus is flexibly managed and controlled, and data analysis accuracy is improved by configuring the data analysis scope, the data source, and the constraint.

In a possible design, the configuration information further includes N data analysis types, and the data analysis type indicates an analysis type of data analysis performed by the data analysis apparatus. N is an integer greater than or equal to 1.

In other words, the first management apparatus may further manage and control (or may be referred to as configure) the analysis type of the data analysis apparatus, for example, a specific type of data that is to be analyzed. For example, if expecting to implement network load planning/balancing, the first management apparatus may manage and control the data analysis apparatus to analyze load data; or if expecting to implement a service experience survey, the first management apparatus may manage and control the data analysis apparatus to analyze service experience data. In this way, to achieve a specific purpose (for example, the network load balancing and the service experience survey), the first management apparatus may configure the data analysis apparatus to analyze corresponding data. This is convenient and efficient.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

It should be noted that the foregoing several data analysis types are merely examples. In actual application, more or fewer data analysis types may be included. This is not limited in embodiments of this application.

In a possible design, when the configuration information includes the N data analysis types, the state information, the prediction capability information, the scope information, the data source information, the constraint, and the like in the configuration information may have the following meanings: The state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint specifically indicates a constraint of data analysis for each of the N data analysis types.

In other words, management and control performed by the first management apparatus on the data analysis apparatus may be refined to management and control on each data analysis type, for example, a status (activated or de-activated), scope information, data source information, and a constraint corresponding to each data analysis type are configured. A plurality of data analysis types may correspond to same scope information, same data source information, a same constraint, and the like, or for each data analysis type, corresponding scope information, corresponding data source information, a corresponding constraint, and the like may be used. In other words, data analysis of different data analysis types that is performed in different manners is more detailed.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In other words, the first management apparatus may manage and control (or configure) enabling or disabling of the data prediction and analysis capability of the data analysis apparatus, and may further manage and control a maximum period of time for data prediction and analysis. For example, when data prediction and analysis needs to be performed, the first management apparatus may configure the data analysis apparatus to enable the data prediction and analysis capability, to implement data prediction. When data prediction does not need to be performed, the first management apparatus may configure the data analysis apparatus to disable the data prediction and analysis capability, to reduce power consumption.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list. The network slice list indicates the data analysis apparatus to analyze data of a network slice in the network handover list. The geographical area indicates the data analysis apparatus to analyze data in the geographical area.

In other words, the first management apparatus may manage and control (or configure) a specific data scope in which the data analysis apparatus performs analysis, for example, analyzing the data of the network element in the network element list, or analyzing the data of the cell in the cell list. In this way, when expecting to analyze data in a specific scope, the first management apparatus may configure the data analysis apparatus to analyze data in the scope, to implement an objective of analyzing the data in the specific scope.

In a possible design, the data source information includes at least one of a data source identifier and data type information. The data source identifier identifies a data source. The data type information indicates a data type of obtained data.

In other words, the first management apparatus may configure a data source for obtaining data by the data analysis apparatus and a data type of obtained data. The data source and the data type are configured by the first management apparatus. Therefore, the data analysis apparatus does not need to determine the data source and the data type, and therefore workload of the data analysis apparatus is low; data obtained from all data sources or all types of data does not need to be analyzed, and therefore efficiency is high. In addition, if the configured data source and data type are accurate, accuracy of data obtained by the data analysis apparatus is high, and accuracy of corresponding data analysis is high accordingly.

In a possible design, the constraint includes at least one of an analysis granularity and an analysis period. The analysis granularity indicates a data granularity for data analysis performed by the data analysis apparatus. The granularity includes at least one of a UE granularity, a cell granularity, a network slice granularity, a 5QI granularity, a service class granularity, and a beam granularity. The analysis period indicates a period for data analysis performed by the data analysis apparatus.

In other words, the first management apparatus may configure the analysis granularity and/or the analysis period of the data analysis apparatus. The analysis granularity is configured to analyze data of different granularities, making data analysis more detailed.

In a possible design, that the first management apparatus sends the configuration information includes: sending a first configuration request to a second management apparatus, where the first configuration request includes the configuration information, the first configuration request is used to request the second management apparatus to configure the data analysis function of the data analysis apparatus, and the second management apparatus is configured to manage the data analysis apparatus. That the first management apparatus sends the configuration information includes: sending the configuration information to the data analysis apparatus.

In other words, the first management apparatus sends the configuration information in a plurality of manners. For example, the first management apparatus may directly send the configuration information to the data analysis apparatus, which is fast and efficient. Alternatively, the second management apparatus (for example, the second management apparatus for managing the data analysis apparatus) configures the data analysis function of the data analysis apparatus. This manner is such simple that direct communication between the first management apparatus and the data analysis apparatus does not need to be established.

In a possible design, the first management apparatus may further determine a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information. The first management apparatus sends the second configuration request.

In other words, the first management apparatus may further delete or modify the data analysis function configured for the data analysis apparatus. For example, the data analysis apparatus has been configured to analyze the N data analysis types, and the first management apparatus may further configure the data analysis apparatus to delete or modify a data analysis type. Assuming a data analysis type is deleted, the data analysis apparatus stops analyzing the data analysis type. For another example, a data analysis type is modified to another data analysis type. Then the data analysis apparatus analyzes the another data analysis type.

According to a second aspect, a management and control method for a data analysis apparatus is provided, applied to a data analysis apparatus. The method includes: The data analysis apparatus receives configuration information, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The data analysis apparatus performs data analysis based on the configuration information.

In other words, according to the management and control method for a data analysis apparatus provided in this application, the data analysis apparatus performs data analysis based on a configuration of the configuration information. For example, the data analysis function of the data analysis apparatus is configured, and/or the data prediction and analysis capability of the data analysis apparatus is configured. When the management and control solution for a data analysis apparatus is applicable to a network operation and maintenance scenario, data analysis of a device (e.g., the data analysis apparatus) in a network architecture may be managed and controlled, to reduce difficulties in the network operation and maintenance scenario and improve network operation and maintenance scenario.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

In a possible design, the configuration information further includes N data analysis types, and the data analysis type indicates an analysis type of data analysis performed by the data analysis apparatus. N is an integer greater than or equal to 1.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

In a possible design, the state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint indicates a constraint of data analysis for each of the N data analysis types.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list. The network slice list indicates the data analysis apparatus to analyze data of a network slice in the network handover list. The geographical area indicates the data analysis apparatus to analyze data in the geographical area.

In a possible design, the data source information includes at least one of a data source identifier and data type information. The data source identifier identifies a data source. The data type information indicates a data type of obtained data.

In a possible design, the constraint includes at least one of an analysis granularity and an analysis period. The analysis granularity indicates a data granularity for data analysis performed by the data analysis apparatus, where the granularity includes at least one of a UE granularity, a cell granularity, a network slice granularity, a 5QI granularity, a service class granularity, and a beam granularity. The analysis period indicates a period for data analysis performed by the data analysis apparatus.

In a possible design, the receiving configuration information includes: receiving the configuration information from a first management apparatus or a second management apparatus, where the second management apparatus is configured to manage the data analysis apparatus; and the first management apparatus is configured to manage the second management apparatus.

In a possible design, the method further includes: creating a management object of the data analysis function, where the management object is used to store configuration information of the data analysis function; and configuring the configuration information in the management object of the data analysis function.

For example, the data analysis apparatus may create the management object (for example, an NEDAF object), configure the configuration information in the management object, and perform data analysis based on the configuration information. The data analysis apparatus may maintain the management object. For example, when the first management apparatus deletes or modifies related information in the configuration information, modified information may be updated to the management object, or to-be-deleted information may be deleted from the management object, to ensure accuracy of the configuration information in the management object.

In a possible design, the method further includes: receiving a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information.

According to a third aspect, a management and control method for a data analysis apparatus is provided, applied to a second management apparatus. The method includes: The second management apparatus receives configuration information, where the configuration information is used to configure a data analysis function of a data analysis apparatus, and the data analysis apparatus is an apparatus managed by the second management apparatus; and the configuration information includes at least one of the following: state information, used to activate or de-activate the data analysis function of the data analysis apparatus; and prediction capability information, used to configure a data prediction and analysis capability of the data analysis apparatus. The second management apparatus sends the configuration information to the data analysis apparatus.

In other words, according to the management and control method for a data analysis apparatus provided in this application, the data analysis apparatus may be flexibly managed and controlled. For example, the second management apparatus may configure the data analysis function of the data analysis apparatus, and/or configure the data prediction and analysis capability of the data analysis apparatus. When the management and control solution for a data analysis apparatus is applicable to a network operation and maintenance scenario, data analysis of a device (e.g., the data analysis apparatus) in a network architecture may be managed and controlled, to reduce difficulties in the network operation and maintenance scenario and improve network operation and maintenance scenario.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

In a possible design, the configuration information further includes N data analysis types, and the data analysis type indicates an analysis type of data analysis performed by the data analysis apparatus. N is an integer greater than or equal to 1.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

In a possible design, when the configuration information includes the N data analysis types, the state information, the prediction capability information, the scope information, the data source information, the constraint, and the like in the configuration information may have the following meanings: The state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint indicates a constraint of data analysis for each of the N data analysis types.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list. The network slice list indicates the data analysis apparatus to analyze data of a network slice in the network handover list. The geographical area indicates the data analysis apparatus to analyze data in the geographical area.

In a possible design, the data source information includes at least one of a data source identifier and data type information. The data source identifier identifies a data source. The data type information indicates a data type of data obtained from the data source.

In a possible design, the constraint includes at least one of an analysis granularity and an analysis period. The analysis granularity indicates a data granularity for data analysis performed by the data analysis apparatus, where the granularity includes at least one of a UE granularity, a cell granularity, a network slice granularity, a 5QI granularity, a service class granularity, and a beam granularity. The analysis period indicates a period for data analysis performed by the data analysis apparatus.

In a possible design, the receiving configuration information includes: receiving a first configuration request from a first management apparatus, where the first configuration request includes the configuration information, the first configuration request is used to request to configure the data analysis function of the data analysis apparatus, and the first management apparatus is configured to manage the second management apparatus.

In a possible design, the method further includes: creating a management object of the data analysis function, where the management object is used to store configuration information of the data analysis function; and configuring the configuration information in the management object of the data analysis function.

In a possible design, the method further includes: receiving a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information; and sending the second configuration request to the data analysis apparatus.

According to a fourth aspect, a communication apparatus is further provided, including: a processing unit, configured to determine configuration information of a data analysis apparatus, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus; and a communication unit, configured to send the configuration information.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

In a possible design, the configuration information further includes N data analysis types, and the data analysis type indicates an analysis type of data analysis performed by the data analysis apparatus. N is an integer greater than or equal to 1.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

In a possible design, when the configuration information includes the N data analysis types, the state information, the prediction capability information, the scope information, the data source information, the constraint, and the like in the configuration information may have the following meanings: The state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint specifically indicates a constraint of data analysis for each of the N data analysis types.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list. The network slice list indicates the data analysis apparatus to analyze data of a network slice in the network handover list. The geographical area indicates the data analysis apparatus to analyze data in the geographical area.

In a possible design, the data source information includes at least one of a data source identifier and data type information. The data source identifier identifies a data source. The data type information indicates a data type of obtained data.

In a possible design, the constraint includes at least one of an analysis granularity and an analysis period. The analysis granularity indicates a data granularity for data analysis performed by the data analysis apparatus, where the granularity includes at least one of a UE granularity, a cell granularity, a network slice granularity, a 5QI granularity, a service class granularity, and a beam granularity. The analysis period indicates a period for data analysis performed by the data analysis apparatus.

In a possible design, the communication unit is specifically configured to send a first configuration request to a second management apparatus, where the first configuration request includes the configuration information, the first configuration request is used to request the second management apparatus to configure the data analysis function of the data analysis apparatus, and the second management apparatus is configured to manage the data analysis apparatus. The communication unit is further configured to send the configuration information to the data analysis apparatus.

In a possible design, the processing unit is further configured to determine a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information. The communication unit is further configured to send the second configuration request.

According to a fifth aspect, a communication apparatus is provided, including: a communication unit, configured to receive configuration information, where the configuration information is used to configure a data analysis function of the communication apparatus, and the configuration information includes at least one of the following: state information, used to activate or de-activate the data analysis function of the data analysis apparatus; and prediction capability information, used to configure a data prediction and analysis capability of the data analysis apparatus; and a processing unit, configured to perform data analysis based on the configuration information.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

In a possible design, the configuration information further includes N data analysis types, and the data analysis type indicates an analysis type of data analysis performed by the data analysis apparatus. N is an integer greater than or equal to 1.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

In a possible design, when the configuration information includes the N data analysis types, the state information, the prediction capability information, the scope information, the data source information, the constraint, and the like in the configuration information may have the following meanings: The state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint indicates a constraint of data analysis for each of the N data analysis types.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list. The network slice list indicates the data analysis apparatus to analyze data of a network slice in the network handover list. The geographical area indicates the data analysis apparatus to analyze data in the geographical area.

In a possible design, the data source information includes at least one of a data source identifier and data type information. The data source identifier identifies a data source. The data type information indicates a data type of obtained data.

In a possible design, the constraint includes at least one of an analysis granularity and an analysis period. The analysis granularity indicates a data granularity for data analysis performed by the data analysis apparatus, where the granularity includes at least one of a UE granularity, a cell granularity, a network slice granularity, a 5QI granularity, a service class granularity, and a beam granularity. The analysis period indicates a period for data analysis performed by the data analysis apparatus.

In a possible design, the communication unit is specifically configured to receive the configuration information from a first management apparatus or a second management apparatus, where the second management apparatus is configured to manage the data analysis apparatus; and the first management apparatus is configured to manage the second management apparatus.

In a possible design, the processing unit is further configured to create a management object of the data analysis function, where the management object is used to store configuration information of the data analysis function; and configure the configuration information in the management object of the data analysis function.

In a possible design, the communication unit is further configured to receive a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information.

According to a sixth aspect, a communication apparatus is provided, including: a communication unit, configured to receive configuration information, where the configuration information is used to configure a data analysis function of a data analysis apparatus, and the data analysis apparatus is an apparatus managed by the communication apparatus; and the configuration information includes at least one of the following: state information, used to activate or de-activate the data analysis function of the data analysis apparatus; and prediction capability information, used to configure a data prediction and analysis capability of the data analysis apparatus.

The communication unit is further configured to send the configuration information to the data analysis apparatus.

In a possible design, the configuration information further includes at least one of scope information, data source information, and a constraint. The scope information indicates a scope of data analysis performed by the data analysis apparatus. The data source information indicates a data source of data analysis performed by the data analysis apparatus. The constraint indicates a constraint of data analysis performed by the data analysis apparatus.

In a possible design, the configuration information further includes N data analysis types, and the data analysis type indicates an analysis type of data analysis performed by the data analysis apparatus. N is an integer greater than or equal to 1.

In a possible design, the N data analysis types include at least one of the following: load data analysis, service experience data analysis, network performance data analysis, congestion data analysis, QoS data analysis, energy saving data analysis, traffic steering data analysis, MIMO data analysis, and UE trajectory data analysis.

In a possible design, when the configuration information includes the N data analysis types, the state information, the prediction capability information, the scope information, the data source information, the constraint, and the like in the configuration information may have the following meanings: The state information is used to activate or de-activate a data analysis function for each of the N data analysis types. The prediction capability information is used to configure a data prediction and analysis capability for each of the N data analysis types. The scope information indicates a data scope of data analysis for each of the N data analysis types. The data source information indicates a data source of data analysis for each of the N data analysis types. The constraint indicates a constraint of data analysis for each of the N data analysis types.

In a possible design, the prediction capability information includes at least one of first indication information and first time information. The first indication information indicates to enable or disable the data prediction and analysis capability of the data analysis apparatus. The first time information indicates the data analysis apparatus to perform prediction and analysis on data that is within a first period of time.

In a possible design, the scope information includes at least one of a network element list, a tracking area code list, a cell list, a network handover list, and a geographical area. The network element list indicates the data analysis apparatus to analyze data of a network element in the network element list. The tracking area code list indicates the data analysis apparatus to analyze data of a tracking area code in the tracking area code list. The cell list indicates the data analysis apparatus to analyze data of a cell in the cell list.

The network slice list indicates the data analysis apparatus to analyze data of a network slice in the network handover list. The geographical area indicates the data analysis apparatus to analyze data in the geographical area.

In a possible design, the data source information includes at least one of a data source identifier and data type information. The data source identifier identifies a data source. The data type information indicates a data type of obtained data.

In a possible design, the constraint includes at least one of an analysis granularity and an analysis period. The analysis granularity indicates a data granularity for data analysis performed by the data analysis apparatus, where the granularity includes at least one of a UE granularity, a cell granularity, a network slice granularity, a 5QI granularity, a service class granularity, and a beam granularity. The analysis period indicates a period for data analysis performed by the data analysis apparatus.

In a possible design, the communication unit is specifically configured to receive a first configuration request from a first management apparatus, where the first configuration request includes the configuration information, the first configuration request is used to request to configure the data analysis function of the data analysis apparatus, and the first management apparatus is configured to manage the second management apparatus.

In a possible design, the processing unit is further configured to create a management object of the data analysis function, where the management object is used to store configuration information of the data analysis function; and configure the configuration information in the management object of the data analysis function.

In a possible design, the communication unit is further configured to receive a second configuration request, where the second configuration request is used to request to configure the data analysis apparatus to perform at least one of the following: deleting the configuration information, deleting or modifying one or more of the N data analysis types in the configuration information, deleting or modifying the scope information in the configuration information, deleting or modifying the data source information in the configuration information, deleting or modifying the constraint in the configuration information, deleting or modifying the state information in the configuration information, and deleting or modifying the prediction capability information in the configuration information; and the communication unit is further configured to send the second configuration request to the data analysis apparatus.

According to a seventh aspect, a management and control method for a data analysis apparatus is provided, applied to a communication system. The communication system includes a first management apparatus and a data analysis apparatus, or the communication system includes a first management apparatus, a second management apparatus, and a data analysis apparatus. The first management apparatus determines configuration information of the data analysis apparatus, where the configuration information is used to configure a data analysis function of the data analysis apparatus; and the configuration information includes at least one of the following: state information, used to activate or de-activate the data analysis function of the data analysis apparatus; and prediction capability information, used to configure a data prediction and analysis capability of the data analysis apparatus. The first management apparatus sends the configuration information.

When the communication system includes the first management apparatus and the data analysis apparatus, the data analysis apparatus receives the configuration information, and performs data analysis based on the configuration information. Alternatively, when the communication system includes the first management apparatus, the second management apparatus, and the data analysis apparatus, the second management apparatus receives the configuration information, and sends the configuration information to the data analysis apparatus. The data analysis apparatus performs data analysis based on the configuration. The second management apparatus is an apparatus for managing the data analysis apparatus, and the first management apparatus is an apparatus for managing the second management apparatus.

According to an eighth aspect, a communication apparatus is further provided, including a processor and a memory. The memory stores program instructions. When the program instructions are executed, the communication apparatus is enabled to perform the method provided in the first aspect. The communication apparatus may be a first management apparatus or an apparatus that can support the first management apparatus in implementing functions required for the method provided in the first aspect, for example, a chip system.

According to a ninth aspect, a communication apparatus is further provided, including a processor and a memory. The memory stores program instructions. When the program instructions are executed, the communication apparatus is enabled to perform the method provided in the second aspect. The communication apparatus may be a data analysis apparatus or an apparatus that can support the data analysis apparatus in implementing functions required for the method provided in the second aspect, for example, a chip system.

According to a tenth aspect, a communication apparatus is further provided, including a processor and a memory. The memory stores program instructions. When the program instructions are executed, the communication apparatus is enabled to perform the method provided in the third aspect. The communication apparatus may be a second management apparatus or an apparatus that can support the second management apparatus in implementing functions required for the method provided in the third aspect, for example, a chip system.

According to an eleventh aspect, a communication system is further provided. The communication system includes a first management apparatus configured to perform the method provided in the first aspect, and a data analysis apparatus configured to perform the method provided in the second aspect; or the communication system includes a first management apparatus configured to perform the method provided in the first aspect, a data analysis apparatus configured to perform the method provided in the second aspect, and a second management apparatus configured to perform the method provided in the third aspect.

According to a twelfth aspect, a computer-readable storage medium is further provided, including a computer program. When the computer program runs on a computer, the computer is enabled to perform the method provided in any one of the first aspect to the third aspect.

According to a thirteenth aspect, a computer program product is further provided, including instructions. When the instructions are run on a computer, the computer is enabled to perform the method provided in any one of the first aspect to the third aspect.

For advantageous effects of the second aspect to the thirteenth aspect, refer to the advantageous effects of the first aspect. Details are not described herein again.

DETAILED DESCRIPTION OF ILLUSTRATIVE EMBODIMENTS

This application aims to provide a management and control solution for a data analysis apparatus, to implement management and control for the data analysis apparatus. For example, a data analysis function of the data analysis apparatus may be configured, and/or a data prediction and analysis capability of the data analysis apparatus may be configured. The data analysis apparatus is flexibly managed and controlled to properly control over data analysis. In this way, data analysis of devices in a network architecture may be performed in a proper and orderly manner. The data analysis function may also be referred to as a data inference function, an intelligence function, a network element inference function, a network element intelligence function, or the like. This is not limited in this application.

An example scenario in which the data analysis apparatus needs to be managed and controlled is a network operation and maintenance scenario in a mobile communication network. Generally, for network operation and maintenance, data of devices in a network architecture need to be analyzed, to implement network planning, network deployment, and the like through data analysis. If the network architecture is complex (for example, there are a large quantity of devices and a large quantity of service types), data analysis is complex, and corresponding network operation and maintenance is difficult and inefficient. In conventional technologies, network operation and maintenance requires manual analysis for device data. If a network architecture includes a large amount of device data and a large quantity of service types, manual data analysis is difficult and inefficient. One solution is to introduce automation technologies (for example, artificial intelligence, machine learning, and big data analysis), e.g., devices in a network architecture automatically perform data analysis. This can help resolve a problem of low operation and maintenance efficiency, reduce manual operations, reduce an operating expense (OPEX) of operators, and improve efficiency. However, there are a large quantity of devices in the network architecture. How to manage automatic data analysis of massive devices in the network architecture has not yet been resolved and needs further discussion.

The foregoing uses an example in which data analysis is used in the network operation and maintenance scenario. It should be noted that the management and control solution for a data analysis apparatus provided in this application is applicable to any scenario in which the data analysis apparatus needs to be managed and controlled, for example, a scenario of mobility management (cell handover or cell reselection). This is not limited in this application.

The following describes a system architecture provided in this application (which may also be referred to as a network management system, a management architecture, a network architecture, or the like).

Figure 1:
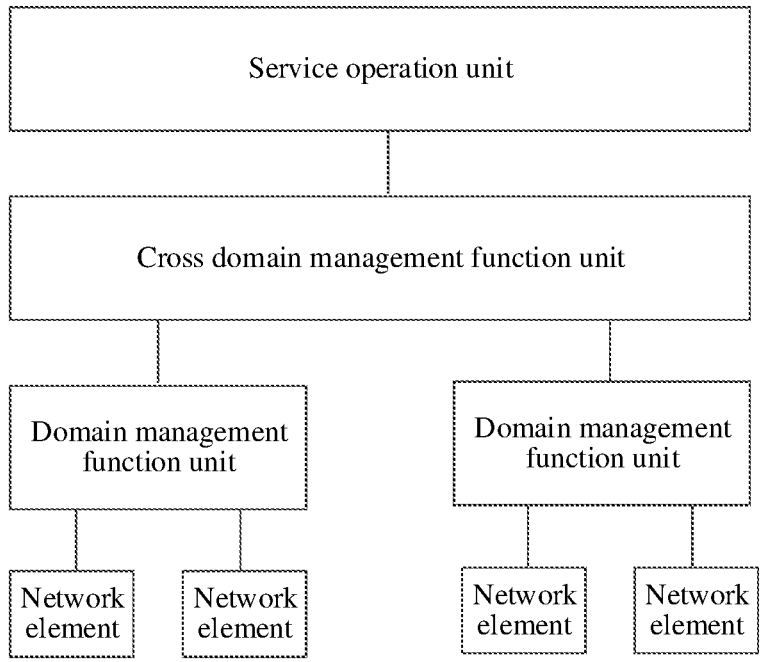
FIG. 1 is an example schematic diagram of a system architecture according to an embodiment of this application.

FIG. 1 is a schematic diagram of a system architecture according to an embodiment of this application. As shown in FIG. 1, the system architecture includes a service operation unit, a cross domain management function unit (CD-MnF), a domain management function unit (D-MnF), and a network element (NE). The service operation unit is configured to manage one or more cross domain management function units. The cross domain management function unit is configured to manage one or more domain management function units. The domain management function unit may be configured to manage one or more network elements. The following briefly describes these units.

The service operation unit, also referred to as a business support system (BSS) or a communication service management function unit (CSMF), is configured to provide functions and management services such as charging, settlement, accounting, customer services, business operating, network monitoring, communication service life cycle management, and service intent translation. The service operation unit may include an operating system of an operator or a vertical operational technology system.

The cross domain management function unit CD-MnF, also referred to as a network management function unit (NMF), may provide one or more of the following functions or management services: network life cycle management, network deployment, network fault management, network performance management, network configuration management, network assurance, network optimization function, translation of a network intent from a communication service provider (intent-CSP), translation of a network intent from a communication service consumer (intent-CSC), and the like. The network herein may include one or more network elements, subnets, or network slices. For example, the cross domain management function unit may be a network slice management function (NSMF), a management data analytic function (MDAF), a cross domain self-organization network function (SON-function), or a cross domain intent management function unit.

It should be noted that, in some deployment scenarios, the cross domain management function unit may also provide one or more of the following management functions or management services: sub-network life cycle management, sub-network deployment, sub-network fault management, sub-network performance management, sub-network configuration management, sub-network assurance, a sub-network optimization function, a sub-network intent translation function, and the like. The subnet may include a plurality of small subnets or a plurality of network slice subnets. For example, an access network subnet of an operator includes an access network subnet of a device vendor 1 and an access network subnet of a device vendor 2.

The domain management function unit D-MnF, also referred to as a subnetwork management function (NMF) or a network element/function management function unit, provides one or more of the following functions or management services: subnet or network element life cycle management, subnet or network element deployment, subnet or network element fault management, subnet or network element performance management, subnet or network element assurance, subnet or network element optimization management, subnet or network element intent translation, and the like. The subnet herein includes one or more network elements. Alternatively, the subnet herein may include one or more subnets, e.g., the one or more subnets form a subnet with a larger coverage area. Alternatively, the subnet herein may include one or more network slice subnets. The subnet may be described in at least one of the following manners: a network in a technical field, for example, a radio access network, a core network, or a transmission network; a network of a standard, for example, a GSM network, an LTE network, or a 5G network; a network provided by a device vendor, for example, a network provided by a device vendor X; and a network in a geographical area, for example, a network of a factory A or a network of a prefecture-level city B.

The network element NE is an entity that provides network services, and includes a core network element, an access network element, and the like. For example, the core network element may include but is not limited to an access and mobility management function (AMF) entity, a session management function (SMF) entity, a policy control function (PCF) entity, a network data analysis function (NWDAF) entity, a network repository function (network repository function, NRF), and a gateway. The access network element may include but is not limited to various base stations (for example, a next generation NodeB (gNB) and an evolved NodeB (eNB)), a central unit control plane (CUCP), a central unit (CU), a distributed unit (DU), a central unit user plane (CUUP), and the like. In this application, a network function NF is also referred to as a network element NE.

In addition, in a service-oriented management architecture, there are a plurality of deployments for a management service producer (MnS producer) and a management service consumer (MnS consumer). For example, when a management service is a management service provided by the foregoing service operation unit, the service operation unit is a management service producer and another service operation unit (for example, the cross domain management function unit, a domain management function unit, or a network element) may be a management service consumer. When a management service is a management service provided by the foregoing cross domain management function unit, the cross domain management function unit is a management service producer and another service operation unit (for example, the service operation unit, the domain management function unit, or the network element) is a management service consumer. When a management service is a management service provided by the domain management function unit, the domain management function unit is a management service producer, and another service operation unit (for example, the cross domain management function unit, the service operation unit, or the network element) is a management service consumer. When a management service is a management service provided by the network element, the network element is a management service producer, and another service operation unit (for example, the domain management function unit, the cross domain management function unit, or the service operation unit) is a management service consumer.

Embodiments of this application provide a management and control method for a data analysis apparatus. In the method, a first management apparatus determines configuration information of a data analysis apparatus, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The first management apparatus sends the configuration information. In this manner, the data analysis apparatus is flexibly managed and controlled to properly control over data analysis. In this way, data analysis of a device in a network architecture may be performed in a proper and orderly manner, to help analyze specific data in the network architecture. The management and control method for a data analysis apparatus provided in embodiments of this application is applicable to the system architecture shown in FIG. 1. When the management and control method for a data analysis apparatus is applicable to the system architecture shown in FIG. 1, there are different settings for the data analysis apparatus and the first management apparatus. Examples are shown below.

1. The first management apparatus may be an upper-level management apparatus of the data analysis apparatus, or a higher-level management apparatus, which specifically includes the following three cases:

A. The first management apparatus is a service operation unit. The data analysis apparatus may be a cross domain management function unit, a domain management function unit, or a network element. The first management apparatus may be the service operation unit, or a logical unit in the service operation unit (for example, a chip in the service operation unit). The data analysis apparatus may be the cross domain management function unit or a logical unit in the cross domain management function unit; or is the domain management function unit or a logical function in the domain management function unit; or is the independent network element or a logical function in the network element.

B. The first management apparatus is a cross domain management function unit. The data analysis apparatus may be a domain management function unit or a network element. The first management apparatus may be the cross domain management function unit or a logical unit in the cross domain management function unit. The data analysis apparatus may be the domain management function unit or a logical function in the domain management function unit. Alternatively, the data analysis apparatus is the independent network element or a logical function in the network element.

C. The first management apparatus is a domain management function unit. The data analysis apparatus may be a network element. The first management apparatus may be the domain management function unit or a logical unit in the domain management function unit. The data analysis apparatus may be the independent network element or a logical function in the network element.

It may be understood that FIG. 1 is described by using an example in which there are three-level management apparatuses above the network element. In actual application, the network architecture may include more or fewer levels of management apparatuses, and the technical solutions provided in this application are also applicable to these network structures.

2. There may alternatively be no upper-level or lower-level limitation between the first management apparatus and the data analysis apparatus. For example, the first management apparatus is a management service producer, and the data analysis apparatus is a management service consumer. For the management service producer and the management service consumer, refer to the foregoing descriptions. Specifically, the following cases are included:

A. When the first management apparatus is a service operation unit, the data analysis apparatus is a unit other than the service operation unit, for example, a cross domain management function unit, a domain management function unit, or a network element.

B. When the first management apparatus is a cross domain management function unit, the data analysis apparatus may be a unit other than the cross domain management function unit, for example, a service operation unit, a domain management function unit, or a network element.

C. When the first management apparatus is a domain management function unit, the data analysis apparatus may be a unit other than the domain management function unit, for example, a service operation unit, a cross domain management function unit, or a network element.

D. The first management apparatus is a network element, and the data analysis apparatus is a unit other than the network element, for example, a service operation unit, a cross domain management function unit, or a domain management function unit.

The following describes in detail the management and control solution for a data analysis apparatus provided in this application.

Figure 2:
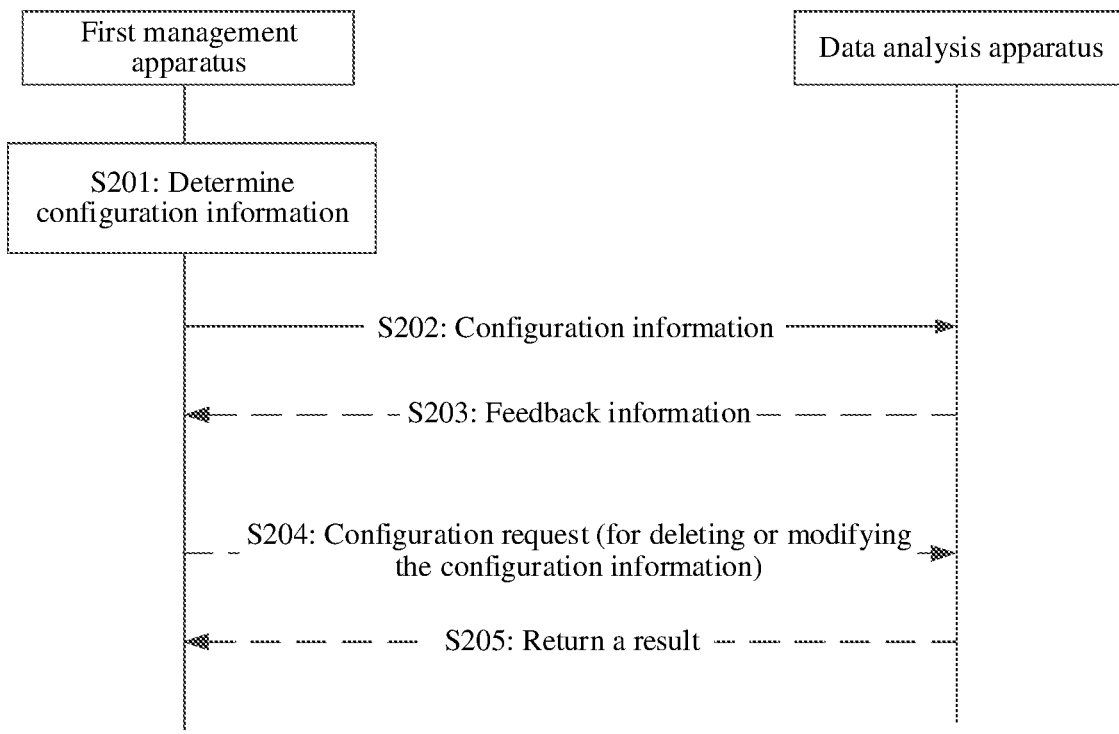
FIG. 2 is a schematic flowchart of a management and control method for a data analysis apparatus according to an embodiment of this application.

FIG. 2 is a schematic flowchart of a management and control method for a data analysis apparatus according to this application. As shown in FIG. 2, the procedure includes the following steps.

S201: A first management apparatus determines configuration information, where the configuration information is used to configure a data analysis function of a data analysis apparatus.

The data analysis function of the data analysis apparatus may be a network data analytic function (network data analytic function, NWDAF), a network element data analytic function (Network Element Data Analytic Function, NEDAF), or a radio data analytic function (radio data analytic function, RDAF). This is not limited in embodiments of this application.

Figure 3:
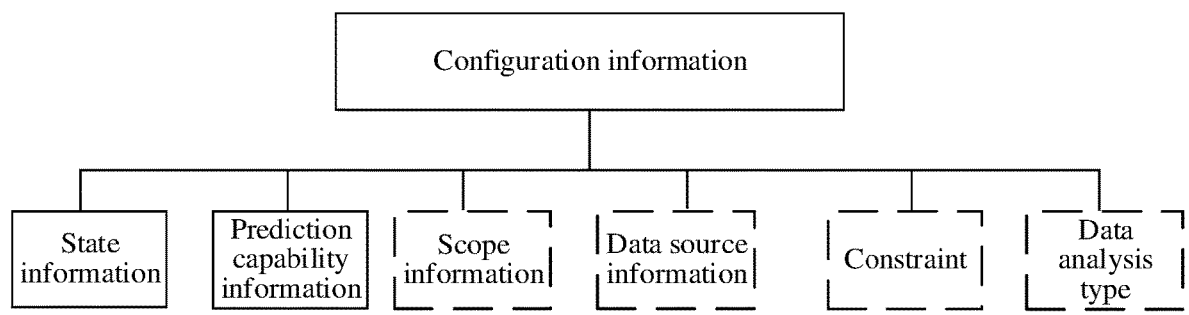
FIG. 3 is a schematic diagram of configuration information according to an embodiment of this application.

FIG. 3 is a schematic diagram of configuration information. As shown in FIG. 3, the configuration information includes at least one of the following information: (1) state information; (2) prediction capability information; (3) scope information; (4) data source information; (5) a constraint; and (6) a data analysis type. It should be noted that FIG. 3 is merely a presentation form of information included in the configuration information for ease of understanding. In actual application, the configuration information may be in any form. This is not limited in this application. In addition, quantities of bits occupied by the state information, the prediction capability information, the scope information, the data source information, the constraint, and the data analysis type in the configuration information, locations (for example, a packet header or trailer) of the state information, the prediction capability information, the scope information, the data source information, the constraint, and the data analysis type in the configuration information, and the like are not limited in this application.

A manner in which the first management apparatus determines the configuration information may be to manually input the configuration information to the first management apparatus, or the configuration information is generated through internal calculation and analysis of the first management apparatus. For example, when it is determined, through internal calculation, that data analysis needs to be performed, the configuration information is generated, where the configuration information is used to configure the data analysis function of the data analysis apparatus, so that the data analysis apparatus performs data analysis. For example, determining, through internal calculation, that data analysis needs to be performed may be determining, through internal calculation, that a data analysis period is reached or a network fault occurs. This is not limited in this application.

(1) State Information

The state information indicates to activate or de-activate the data analysis function of the data analysis apparatus. "Activate" may alternatively be replaced with "enable", "open", or "start". Correspondingly, "de-activate" may alternatively be replaced with "disable", "close", "stop".

The first management apparatus may determine the state information as required. For example, when determining that the data analysis apparatus needs to perform data analysis, the first management apparatus determines the state information. In this case, the state information indicates to activate the data analysis function of the data analysis apparatus. For example, the state information may be indication information represented as activated, 1, or activation. Alternatively, when determining that the data analysis apparatus does not need to perform data analysis, the first management apparatus determines the state information. In this case, the state information indicates to de-activate the data analysis function of the data analysis apparatus. For example, the state information may be indication information represented as de-activated, o, or de-activation. In other words, the data analysis apparatus may be flexibly managed and controlled. For example, when the data analysis apparatus needs to perform data analysis, the data analysis function of the data analysis apparatus is activated, to implement data analysis. When the data analysis apparatus does not need to perform data analysis, the data analysis function of the data analysis apparatus is de-activated, to reduce power consumption of the data analysis apparatus.

Optionally, the data analysis apparatus may set a management and control status. For example, the management and control status includes two states: activated (activated) and de-activated (de-activated). The activated state may also be referred to as an enabled (enabled) state, an open (open) state, or the like. Correspondingly, the de-activated state may also be referred to as a disabled (disabled) state, a closed (closed) state, or the like. The data analysis apparatus adjusts the management and control status based on the state information included in the configuration information. For example, to reduce power consumption, the data analysis apparatus is in the de-activated state by default. After receiving the configuration information, when determining, based on the state information in the configuration information, that the data analysis function needs to be activated, the data analysis apparatus switches the management and control status from the de-activated state to the activated state.

It should be understood that the configuration information may include the state information, or may not include the state information. For example, the data analysis function of the data analysis apparatus is always in the activated state by default (for example, the data analysis function configured by default at delivery) and does not need to be de-activated. In this case, the configuration information may not include the state information. Simply speaking, the first management apparatus does not need to activate or de-activate the data analysis function of the data analysis apparatus. The data analysis function is always in the activated state.

(2) Prediction Capability Information

The prediction capability information is used to configure a data prediction and analysis capability of the data analysis apparatus. The data prediction and analysis capability may be simply understood as predicting a network status in a future period of time based on current data.

The first management apparatus may determine the prediction capability information as required. For example, when the data analysis apparatus needs to have the data prediction and analysis capability, the prediction capability information is determined. In this case, the prediction capability information indicates to enable (or open or activate) the data prediction and analysis capability of the data analysis apparatus, to implement data prediction. When the data analysis apparatus does not need to have the data prediction and analysis capability, the prediction capability information is determined. In this case, the prediction capability information indicates to disable (or stop or de-activate) the data prediction and analysis capability of the data analysis apparatus, to reduce power consumption of the data analysis apparatus.

Optionally, the prediction capability information may include at least one of the following information: first indication information, indicating to enable or disable the data prediction and analysis capability of the data analysis apparatus; and first time information, indicating to perform prediction and analysis on data that is within a first period of time.

For example, the first indication information is 1, and indicates to enable the data prediction and analysis capability of the data analysis apparatus; the first indication information is 0, and indicates to disable the data prediction and analysis capability of the data analysis apparatus. Assuming that the first time information is 24 hours, the data analysis apparatus performs prediction and analysis on data within 24 hours starting from a moment at which the first indication information is received, and may not perform prediction and analysis on data that is not within 24 hours. Therefore, the first time information may be understood as a maximum period of time for performing prediction and analysis on data.

For example, the first management apparatus expects the data analysis apparatus to predict a network load status within a future period of time. The first management apparatus determines the configuration information, where the configuration information includes a data analysis type: network load analysis, and further includes the prediction capability information. The prediction capability information indicates to enable a prediction and analysis capability of the data analysis apparatus for network load. In this way, the data analysis apparatus may predict the network load status within the future period of time. Specifically, there are a plurality of manners of prediction. For example, the network load within the future period of time is predicted based on historical network load. Assume that a network peak period (for example, within which a network throughput is high or a transmission rate is low) within a future period of time starting from a current moment in history, it is predicted that the network load is high within the future period of time.

It should be understood that the configuration information may include the prediction capability information, or may not include the prediction capability information. For example, by default, the data prediction and analysis capability of the data analysis apparatus is always in an enabled state and does not need to be disabled. In other words, the first management apparatus does not need to control the data prediction and analysis capability of the data analysis apparatus. Therefore, the configuration information may not include the prediction capability information.

(3) Scope Information

The scope information indicates a scope of data analysis performed by the data analysis apparatus.

The first management apparatus may determine the scope information as required. For example, when the first management apparatus needs to determine to analyze network data of one or more network elements, the first management apparatus determines the scope information. In this case, the scope information includes the network element. For another example, when the first management apparatus needs to determine to analyze network data of one or more cells, the first management apparatus determines the scope information. In this case, the scope information includes the cell. To be specific, the first management apparatus configures a scope of data on which the data analysis apparatus performs data analysis. In this way, the data analysis function of the data analysis apparatus is flexibly managed and controlled, and data analysis accuracy is improved by configuring the data analysis scope.

Optionally, the scope information may include at least one of the following:

1. A network element list (NeList) indicates the data analysis apparatus to analyze data of a network element in the network element list. Optionally, the network element list may include one or more network element identifiers. The network element identifier may be a network element address, a network element name, or the like. This is not limited in embodiments of this application. For descriptions of the network element, refer to the foregoing descriptions. Details are not described herein again.
2. A tracking area code list (TacList) indicates the data analysis apparatus to analyze data of a tracking area code in the tracking area code list. A tracking area code (tracking area code, TAC) may be used to define a tracking area code to which a cell belongs, and one tracking area may cover one or more cells.
3. A cell list indicates the data analysis apparatus to analyze data of a cell in the cell list. Optionally, the cell list may include one or more cell identifiers. The cell identifier may be a cell ID, a cell address, or the like. This is not limited in embodiments of this application. Cells may be various types of base stations (for example, a next generation NodeB (gNB) and an evolved NodeB (evolved NodeB, eNB)), and the like.
4. A network slice list indicates the data analysis apparatus to analyze data of a network handover in the network handover list. The network slice is also referred to as a slice, and may be considered as a communication network that is created to meet a service requirement and that includes a plurality of network function network elements. The network slice may be shared by a plurality of services, or may be exclusively used by one service, and is applicable to a plurality of communication services deployed on a same infrastructure of an operator. The network slice is an on-demand networking mode. A network operator deploys a plurality of virtual network slices or end-to-end networks on a unified infrastructure. Each network slice is logically isolated from a radio access network, a bearer network, to a core network, to adapt to various service applications. A network slice includes at least a radio sub-slice, a bearer sub-slice, and a core network sub-slice. The network slice list herein may be a network slice list S-NSSAIList, a network slice instance NSIlist, or a network slice subnet instance list NSSIList.

5. A geographical area indicates the data analysis apparatus to analyze data in a scope of the geographical area. Optionally, the geographical area may be described using longitude and latitude points.

The foregoing provides several examples of the scope information, and there may be more scope division manners. This is not limited in embodiments of this application. In conclusion, the first management apparatus may configure the data analysis apparatus to analyze data in a specific data scope. In this way, when expecting to analyze data in a specific scope, the first management apparatus may configure the data analysis apparatus to analyze data in the scope, to implement an objective of analyzing the data in the specific scope.

It should be understood that the configuration information may include the scope information, or may not include the scope information. For example, the data analysis apparatus may use default scope information, and the default scope information may be preconfigured. Alternatively, the data analysis apparatus may determine the scope information, e.g., the first management apparatus does not need to configure the scope information. Therefore, the configuration information may not include the scope information.

(4) Data Source Information

The data source information indicates a data source of data analysis performed by the data analysis apparatus, e.g., indicates a specific device from which the data analysis apparatus obtains data for analysis.

The first management apparatus may determine the data source information as required. For example, if the first management apparatus needs to determine a specific device from which data is obtained, the first management apparatus sends the data source information to the data analysis apparatus, where the data source information indicates the data analysis apparatus to obtain, for analysis, data from a data source indicated by the data source information. In other words, the first management apparatus may further manage and control the data source for performing data analysis by the data analysis apparatus and a data type of the obtained data. In this way, the data analysis apparatus does not need to determine the data source and the data type, and therefore workload of the data analysis apparatus is low; data obtained from all data sources or all types of data does not need to be analyzed, and therefore efficiency is high.

Optionally, the data source information may include at least one of the following:

A data source identifier uniquely identifies a data source. For example, the data source may be a network element or a management function (MnF) unit, where the management function unit may be a cross domain management function unit, a domain management function unit, or the like. The data source identifier may be an ID, a distinguish name (DN), or the like, or may be a data source address, for example, an IP address or a uniform/universal resource locator (URI).

A data type indicates a data type of obtained data, for example, may indicate a type of data obtained from a data source, e.g., the data type of the obtained data. For example, the data type may be a specific data name, for example, a performance indicator name (for example, a quantity of slice users and a quantity of RRC connections). Alternatively, the data type may be a configuration data name, for example, a cell status or a network slice configuration parameter. Alternatively, the data type may be a fault data name, for example, a cell fault. Alternatively, the data type may be a coverage type, a handover type, a capacity type, a mobility type, or the like.

It should be understood that the configuration information may include the data source information, or may not include the data source information. For example, the data analysis apparatus may use a default data source, and the default data source may be preconfigured. Alternatively, the data analysis apparatus may determine the data source, e.g., the first management apparatus does not need to configure the data source information. Therefore, the configuration information may not include the data source information.

(5) Constraint

The constraint indicates a constraint used when the data analysis apparatus performs data analysis.

The first management apparatus may determine the constraint as required. For example, when data analysis needs to be performed on data of UE, the constraint is determined. In this case, the constraint indicates that a data granularity at which the data analysis apparatus performs data analysis is a UE granularity. For another example, when data analysis needs to be performed on data of a cell, the constraint is determined. In this case, the constraint indicates that a data granularity at which the data analysis apparatus performs data analysis is a cell granularity. The analysis granularity is configured to analyze data of different granularities, making data analysis more detailed.

Optionally, the constraint may include at least one of the following:

1. A data granularity indicates a data granularity for data analysis performed by the data analysis apparatus. Simply speaking, the data granularity is a specific granularity at which data is analyzed. The granularity includes but is not limited to the UE granularity, the cell granularity, a network slice granularity, a 5QI granularity, a service type granularity, and a beam granularity. The UE granularity refers to analyzing the data of the UE, for example, analyzing uplink transmission data or downlink transmission data of UE or a UE group. The cell granularity refers to analyzing the data of the cell, for example, analyzing uplink data or downlink data of a cell or a cell list. The network slice granularity refers to analyzing data (for example, network delay data) of a network slice or a network slice group. The 5QI granularity refers to analyzing data (for example, a call drop rate) of a 5G QoS identifier or a 5G QoS identifier list. The service data granularity refers to analyzing data of a service or a plurality of services in a service list, for example, analyzing data (for example, a user-perceived rate) of a V2X internet of vehicle service, and analyzing data (for example, a quantity of activated users) of an intelligent metering service. The beam granularity refers to analyzing data (for example, data transmitted on a beam) corresponding to a beam or a beam set. For example, the data analysis apparatus has transmit/receive beams in a plurality of directions, and may indicate the data analysis apparatus to analyze data on a transmit/receive beam in one or more directions.

2. A data analysis period indicates a period in which the data analysis apparatus performs data analysis, e.g., how often data analysis is performed, including but not limited to every minute, every hour, every day, every week, every month, and the like.

It should be understood that the configuration information may include the constraint, or may not include the constraint. For example, the data analysis apparatus may use a default constraint, and the default constraint may be preconfigured. Alternatively, the data analysis apparatus may determine the constraint, e.g., the first management apparatus does not need to configure the constraint. Therefore, the configuration information may not include the constraint.

(6) Data Analysis Type

The data analysis type indicates an analysis type of data analysis performed by the data analysis apparatus, and may be understood as a type of data for performing data analysis.

The first management apparatus may determine the data analysis type as required. For example, when the first management apparatus needs to analyze a data analysis type, the configuration information carries the data analysis type. In other words, the first management apparatus may manage and control a specific type of data that is to be analyzed by the data analysis apparatus.

Optionally, the data analysis type may include at least one of the following:

1. Load information (load level information) analysis indicates the data analysis apparatus to analyze load information to obtain the load information. The load information may include a load level, and different load levels represent different load strengths. Load may include a network capacity, a traffic volume, a resource usage amount, and the like.
2. Service experience (service experience) analysis indicates the data analysis apparatus to analyze service experience information. The service experience information may include whether QoE is met, a proportion of UE that meets the QoE, and the like. Services may be various 5G services. This is not specifically limited in this application.
3. Network performance (network performance) analysis indicates the data analysis apparatus to analyze network performance. The network performance may include coverage performance, user rate performance, and the like.
4. Congestion (user data congestion) analysis indicates the data analysis apparatus to analyze a congestion status. Congestion may include information indicating whether congestion occurs, a congestion level, a period of time within which congestion occurs, and the like.
5. Quality of service (quality of service, QoS) analysis indicates the data analysis apparatus to analyze QoS. QoS may include a transmission bandwidth, a transmission delay, a packet loss rate of transmitted data, and the like.
6. Energy saving (energy saving) analysis indicates the data analysis apparatus to analyze energy saving information. The energy saving information may include information indicating whether an energy saving switch needs to be enabled, a time point for enabling the energy saving switch, an energy efficiency gain, and the like.
7. Traffic analysis indicates the data analysis apparatus to analyze traffic information. The traffic information refers to a traffic volume, a busy hour, an idle hour, and the like. Further, analysis of the traffic information may alternatively be analysis of traffic steering (traffic steering). This is not limited in embodiments of this application.
8. MIMO analysis indicates the data analysis apparatus to analyze MIMO information. The MIMO information may include a MIMO scenario or a weight. Further, analysis of the MIMO information may alternatively be analysis of massive MIMO information. This is not limited in embodiments of this application.
9. UE trajectory (trajectory) analysis indicates the data analysis apparatus to analyze UE trajectory information. The UE trajectory information may refer to a movement trajectory of the UE, for example, a cell handover/re-trajectory.

It should be noted that nine data analysis types are exemplified above. It may be understood that in actual application, more or fewer data analysis types may be included. This is not limited in embodiments of this application. In addition, data analysis of different data analysis types may be implemented by configuring the data analysis type of the data analysis apparatus. For example, when service experience is expected to be analyzed, the data analysis apparatus is configured to analyze service experience data. When network load is expected to be analyzed, the data analysis apparatus is configured to analyze load data. For example, to implement specific analysis (for example, network load balancing and a service experience survey), the first management apparatus may configure the data analysis apparatus to analyze corresponding data. This is convenient and efficient.

The configuration information may include N data analysis types, where N is an integer greater than or equal to 1. For ease of understanding, two cases in which N=1 and N>1 are used below for description.

1. N>1

For example, the configuration information includes a plurality of data analysis types.

In Case 1, in addition to the plurality of data analysis types, the configuration information may further include other information such as the prediction capability information, the scope information, the data source information, and the constraint. In this case, the other information in the configuration information is applicable to all the plurality of data analysis types in the configuration information. For example, in addition to the plurality of data analysis types (for example, the foregoing nine data analysis types), the configuration information further includes the state information. The state information indicates to activate or de-activate the data analysis function of the data analysis apparatus for each of the plurality of data analysis types. For another example, the configuration information further includes the prediction capability information, and the prediction capability information indicates to enable or disable the data prediction and analysis capability of the data analysis apparatus for each of the plurality of data analysis types. For another example, the configuration information further includes the scope information, and the scope information indicates scope information of data analysis that is of each of the plurality of data analysis types and that is performed by the data analysis apparatus. For another example, the configuration information may further include the data source information, and the data source information indicates a data source of data analysis that is of each of the plurality of data analysis types and that is performed by the data analysis apparatus. For another example, the configuration information further includes the constraint, and the constraint indicates a constraint of data analysis that is of each of the plurality of data analysis types and that is performed by the data analysis apparatus. Alternatively, it may be understood that prediction capability information, scope information, data source information, or constraints corresponding to the plurality of data analysis types in the configuration information are the same.

For example, N=2. For example, the configuration information includes two data analysis types: a first data analysis type and a second data analysis type. In addition to the two data analysis types, the configuration information may further include at least one of the state information, the prediction capability information, the scope information, the data source information, or the constraint. The information (e.g., the state information, the prediction capability information, the scope information, the data source information, the constraint) is applicable to both the first data analysis type and the second data analysis type. For example, if the state information indicates to activate the data analysis function of the data analysis apparatus, the data analysis apparatus activates a data analysis function for the first data analysis type and a data analysis function for the second data analysis type (e.g., the data analysis functions for both the first data analysis type and the second data analysis type are activated). For another example, if the scope information indicates a data scope of data analysis performed by the data analysis apparatus, the data scope is used when the data analysis apparatus analyzes the first data analysis type, and the data scope is also used when the data analysis apparatus analyzes the second data classification type. For another example, if the prediction capability information is used to enable the data prediction and analysis capability of the data analysis apparatus, the data analysis apparatus enables a data prediction and analysis capability for analyzing the first data analysis type and a data prediction and analysis capability for analyzing the second data classification type. For another example, if the data source information indicates a data source of data analysis performed by the data analysis apparatus, the data source is used when the data analysis apparatus analyzes the first data analysis type, and the data source is also used when the data analysis apparatus analyzes the second data classification type. For another example, if the constraint indicates a constraint used when the data analysis apparatus performs data analysis, the constraint is used when the data analysis apparatus analyzes the first data analysis type, and the constraint is also used when the data analysis apparatus analyzes the second data classification type. Simply speaking, other information (for example, the prediction capability information, the scope information, the data source information, and the constraint) in the configuration information is applicable to each of the plurality of data analysis types in the configuration information.

For ease of understanding, Table 1 shows an example of the configuration information.

TABLE 1

| Configuration information | | | | | |
|---|---|---|---|---|---|
| Data analysis type | State information | Prediction capability information | Scope information | Data source information | Constraint |
| Load information analysis | 1 | 1 | Network element list | Data source identifier | UE granularity |
| Service experience analysis | | | | | |
| Network performance analysis | | | | | |
| Congestion analysis | | | | | |
| QoS analysis | | | | | |
| Energy saving analysis | | | | | |
| Traffic steering analysis | | | | | |
| MIMO analysis | | | | | |
| UE trajectory analysis | | | | | |

Refer to Table 1. Other information (for example, the prediction capability information, the scope information, the data source information, and the constraint) in the configuration information is applicable to each data analysis type.

In Case 2, the configuration information includes a plurality of data analysis types, and each data analysis type corresponds to separate prediction capability information, separate scope information, separate data source information, a separate constraint, and the like. Different from Case 1 in which the configuration information includes the plurality of data analysis types, and all the data analysis types correspond to same prediction capability information, same scope information, same data source information, and a same constraint, in Case 2, the configuration information includes the plurality of data analysis types, but each data analysis type corresponds to separate prediction capability information, separate scope information, separate data source information, and a separate constraint.

For example, N=2. The configuration information includes a first data analysis type and a second data analysis type. The configuration information may further include first state information and second state information. The first state information is used to activate or de-activate a data analysis function of the data analysis apparatus for the first data analysis type, and the second state information is used to activate or de-activate a data analysis function of the data analysis apparatus for the second data analysis type. The configuration information may further include first scope information and second scope information. The first scope information is applicable to the first data analysis type, e.g., the first scope information is used during analysis of the first data analysis type. The second scope information is applicable to the second data analysis type, e.g., the second scope information is used during analysis of the second data type. The configuration information may further include first data source information and second data source information. The first data source information is applicable to the first data analysis type, e.g., the first data source information is used during analysis of the first data analysis type. The second data source information is applicable to the second data analysis type, e.g., the second data source information is used during analysis of the second data type. The configuration information may further include first prediction capability information and second prediction capability information. The first prediction capability information is used to configure a data prediction and analysis capability used during analysis of the first data analysis type, and the second prediction capability information is used to configure a data prediction and analysis capability used during analysis of the second data analysis type. The configuration information may further include a first constraint and a second constraint. The first constraint indicates a constraint used when the data analysis apparatus performs analysis of the first data analysis type, and the second constraint indicates a constraint used when the data analysis apparatus performs analysis of the second data analysis type.

For ease of understanding, Table 2 shows another example of the configuration information.

TABLE 2

| | | Configuration information | | | |
|---|---|---|---|---|---|
| Data analysis type | State information | Prediction capability information | Scope information | Data source information | Constraint |
| Load information analysis | 1 | 0 | | | |
| Service experience analysis | 1 | 0 | | | |
| Network performance analysis | 0 | 0 | | | |
| Congestion analysis | 0 | 0 | | | |
| QoS analysis | 0 | 0 | | | |
| Energy saving analysis | 1 | 1 | | | |
| Traffic steering analysis | 1 | 1 | | | |
| MIMO analysis | 1 | 1 | | | |
| UE trajectory analysis | 1 | 1 | | | |

For example, in Case 2, the configuration information includes N data analysis types, and each data analysis type corresponds to separate state information, separate prediction capability information, separate scope information, separate data source information, a separate constraint, and the like.

When N>1, one piece of configuration information can be used to configure a plurality of data analysis types, and each data analysis type does not need to be separately configured. This reduces signaling overheads and improves efficiency.

2. N=1

For example, the configuration information includes one data analysis type.

In the case in which N>1, the configuration information may include the plurality of data analysis types. Briefly, one piece of configuration information may be used to configure the plurality of data analysis types. Different from this, in the case in which N=1, the configuration information is specific to one data analysis type, e.g., if the first management apparatus expects to configure the data analysis apparatus to perform data analysis of two different data analysis types, the first management apparatus needs to send two pieces of configuration information to respectively configure the two data analysis types.

Figure 4:
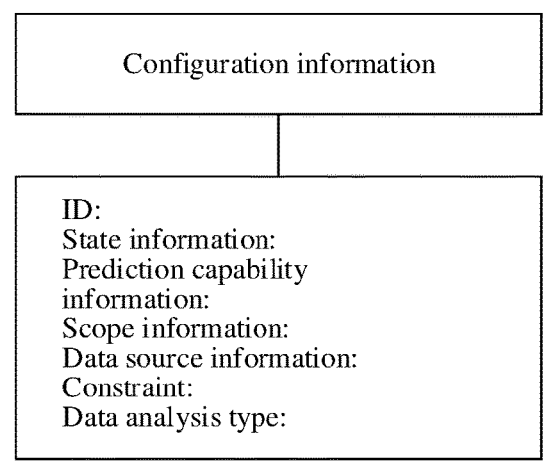
FIG. 4 is another schematic diagram of configuration information according to an embodiment of this application.

FIG. 4 is another schematic diagram of configuration information. As shown in FIG. 4, the configuration information includes a configuration information identifier (configuration information ID), uniquely identifying configuration information for a specific data analysis type. For example, the data analysis type includes one of load information analysis, service experience analysis, network performance analysis, congestion analysis, quality of service analysis, energy saving analysis, traffic steering analysis, MIMO analysis, and UE trajectory analysis. Configuration information corresponding to each data analysis type has a unique configuration information ID. For example, a configuration information ID corresponding to load information analysis is an ID 1, a configuration information ID corresponding to service experience analysis is an ID 2, a configuration information ID corresponding to network performance analysis is an ID 3, a configuration information ID corresponding to congestion analysis is an ID 4, a configuration information ID corresponding to quality of service analysis is an ID 5, a configuration information ID corresponding to energy saving analysis is an ID 6, a configuration information ID corresponding to traffic steering analysis is an ID 7, a configuration information ID corresponding to MIMO analysis is an ID 8, and a configuration information ID corresponding to UE trajectory analysis is an ID 9.

For example, a first management apparatus determines first configuration information and second configuration information. The first configuration information includes a first data analysis type. In addition to the first data analysis type, the first configuration information may further include at least one of first state information, first preset capability information, first scope information, first data source information, and a first constraint. The information is applicable to the first data analysis type. The second configuration information includes a second data analysis type. In addition to the second data analysis type, the second configuration information may further include at least one of second state information, second preset capability information, second scope information, second data source information, and a second constraint. The information is applicable to the second data analysis type.

For ease of understanding, Table 3 and Table 4 respectively show examples of the first configuration information and the second configuration information.

TABLE 3

| | | First configuration information | | | |
|---|---|---|---|---|---|
| First data analysis type | First state information | First prediction capability information | First scope information | First data source information | First constraint |
| Load information analysis | | | | | |

TABLE 4

| | | Second configuration information | | | |
|---|---|---|---|---|---|
| Second data analysis type | Second state information | Second prediction capability information | Second scope information | Second data source information | Second constraint |
| Service experience analysis | | | | | |

It can be learned through comparison between Table 3 and Table 4 that the first management apparatus implements separate configurations of the two data analysis types based on the two pieces of configuration information. Similarly, when the first management apparatus requires the data analysis apparatus to separately perform analysis of N data analysis types, the first management apparatus needs to configure a data analysis function of the data analysis apparatus for each data analysis type by using N pieces of configuration information.

When N=1, configuring the data analysis function of the data analysis apparatus by the first management apparatus may be specific for each data analysis type (for example, configuring a status (activated or de-activated), scope information, data source information, and a constraint corresponding to each data analysis type). In addition, for each data analysis type, corresponding scope information, corresponding data source information, a corresponding constraint, and the like may be used. In other words, data analysis of different data analysis types that is performed in different manners is more detailed and more accurate.

S202: The first management apparatus sends the configuration information, and correspondingly the data analysis apparatus receives the configuration information.

A manner in which the first management apparatus sends the configuration information includes Manner A or Manner B.

Manner A: The first management apparatus may send a first configuration request to the second management apparatus, where the first configuration request includes the configuration information, the first configuration request is used to request the second management apparatus to configure a data analysis function of the data analysis apparatus, the second management apparatus may be an apparatus for managing the data analysis apparatus, and the first management apparatus may be an apparatus for managing the second management apparatus. It may be simply understood that the first management apparatus is an upper-level management apparatus of the second management apparatus, and the second management apparatus is an upper-level management apparatus of the data analysis apparatus. In this manner, a management and control interface is introduced between the first management apparatus and the second management apparatus, so that the first management apparatus can send the first configuration request to the second management apparatus, to implement management and control on the data analysis apparatus by using the second management apparatus. If the architecture shown in FIG. 1 is used as an example, the first management apparatus may be a service operation unit or a cross domain management function unit. When the first management apparatus is the service operation unit, the second management apparatus may be a cross domain management function unit, and the data analysis apparatus may be a domain management function unit or a network element; or the second management apparatus is a cross domain management function unit or a domain management function unit, and the data analysis apparatus is a network element. When the first management apparatus is the cross domain management function unit, the second management apparatus may be a domain management function unit, and the data analysis apparatus may be a network element.

Manner B: The first management apparatus may directly send the configuration information to the data analysis apparatus, e.g., configures the data analysis apparatus without using the second management apparatus. Briefly, the first management apparatus directly manages and controls the data analysis apparatus. In this manner, a management and control interface may be introduced between the first management apparatus and the data analysis apparatus, so that the first management apparatus can directly send the configuration information to the data analysis apparatus, to implement management and control on the data analysis apparatus. If the architecture shown in FIG. 1 is used as an example, when the first management apparatus is a service operation unit, the data analysis apparatus may be a cross domain management function unit, a domain management function unit, or a network element. Alternatively, when the first management apparatus is a cross domain management function unit, the data analysis apparatus may be a domain management function unit or a network element. Alternatively, when the first management apparatus is a domain management function unit, the data analysis apparatus may be a network element.

S203: The data analysis apparatus sends feedback information, where the feedback information indicates whether the data analysis apparatus successfully receives the configuration information, and/or indicates whether a configuration of the data analysis function of the data analysis apparatus is completed.

Optionally, step S203 may or may not be performed. This is not limited in this application. Therefore, S203 is represented by dashed lines in the figure. In addition, it should be understood that if the data analysis apparatus receives the configuration information from the second management apparatus (e.g., in Manner A), the data analysis apparatus sends the feedback information to the second management apparatus, and the second management apparatus sends the feedback information to the first management apparatus. If the data analysis apparatus directly receives the configuration information from the first management apparatus without using the second management apparatus (e.g., in Manner B), the data analysis apparatus sends the feedback information to the first management apparatus.

According to the management and control method for a data analysis apparatus provided in this application, the data analysis function of the data analysis apparatus may be configured, for example, a data analysis scope, a data analysis type, a data source, and a constraint are configured. If the management and control solution for a data analysis apparatus is applied to a network operation and maintenance scenario, a data analysis function of a device (e.g., the data analysis apparatus) in a network architecture may be configured, to help reduce difficulties in network operation and maintenance of the network architecture and improve network operation and maintenance scenario.

S204: The first management apparatus sends a configuration request to the data analysis apparatus, where the configuration request is used to request to delete or modify the configuration information.

The configuration information may include N data analysis types, and there are two cases in which N=1 and N>1.

When N>1, e.g., the configuration information may be used to configure a plurality of data analysis types, the configuration request may indicate the data analysis apparatus to perform at least one of the following: deleting the configuration information, for example, deleting all the configuration information; deleting or modifying one or more of the N data analysis types in the configuration information, for example, deleting a specific data analysis type in the configuration information, or modifying the data analysis type to another data analysis type; deleting or modifying the scope information in the configuration information, for example, deleting the scope information in the configuration information, or modifying the scope information to new scope information; deleting or modifying the data source information in the configuration information, for example, deleting the data source information in the configuration information, or modifying the data source information to new data source information; deleting or modifying the constraint in the configuration information, for example, deleting the constraint in the configuration information, or modifying the constraint to a new constraint; deleting or modifying the state information in the configuration information, for example, deleting the state information in the configuration information, or modifying the state information to new state information (for example, switching from activation to de-activation); and deleting or modifying the prediction capability information in the configuration information, for example, deleting the prediction capability information in the configuration information, or modifying the prediction capability information to new prediction capability information (for example, switching from enabling a prediction capability to disabling the prediction capability).

Table 1 is used as an example. The first management apparatus may delete or modify one or more data analysis types in Table 1, or may delete or modify the scope information in Table 1, or may delete or modify the data source information in Table 1, or may delete or modify the data source information in Table 1, or may delete or modify the constraint in Table 1, or may delete or modify the state information in Table 1, or may delete or modify the prediction capability information in Table 1.

When N=1, e.g., the configuration information is to configure a specific data analysis type, the configuration request may indicate the data analysis apparatus to perform at least one of the following: deleting the configuration information; deleting or modifying the specific data analysis type in the configuration information; deleting or modifying the scope information in the configuration information; deleting or modifying the data source information in the configuration information; deleting or modifying the constraint in the configuration information; deleting or modifying the state information in the configuration information; and deleting or modifying the prediction capability information in the configuration information.

S205: The data analysis apparatus may further return a result to the first management apparatus, where the result indicates whether the data analysis apparatus successfully receives the configuration request, or indicates whether the configuration information is successfully deleted or modified.

It should be noted that steps S204 and S205 may or may not be performed, and therefore are represented by dashed lines in the figure.

The following describes, by using the system architecture shown in FIG. 1, examples of the technical solutions provided in embodiments of this application.

EXAMPLE 1

In this example, N>1, e.g., one piece of configuration information may be used to configure data analysis functions of a plurality of data analysis types. For example, the configuration information includes a data analysis type list, and the list includes a plurality of data analysis types. In addition, for example, the first management apparatus in FIG. 2 is a cross domain management function unit in the system architecture shown in FIG. 1, and the data analysis apparatus in FIG. 2 is a network element in the system architecture shown in FIG. 1.

Figure 5:
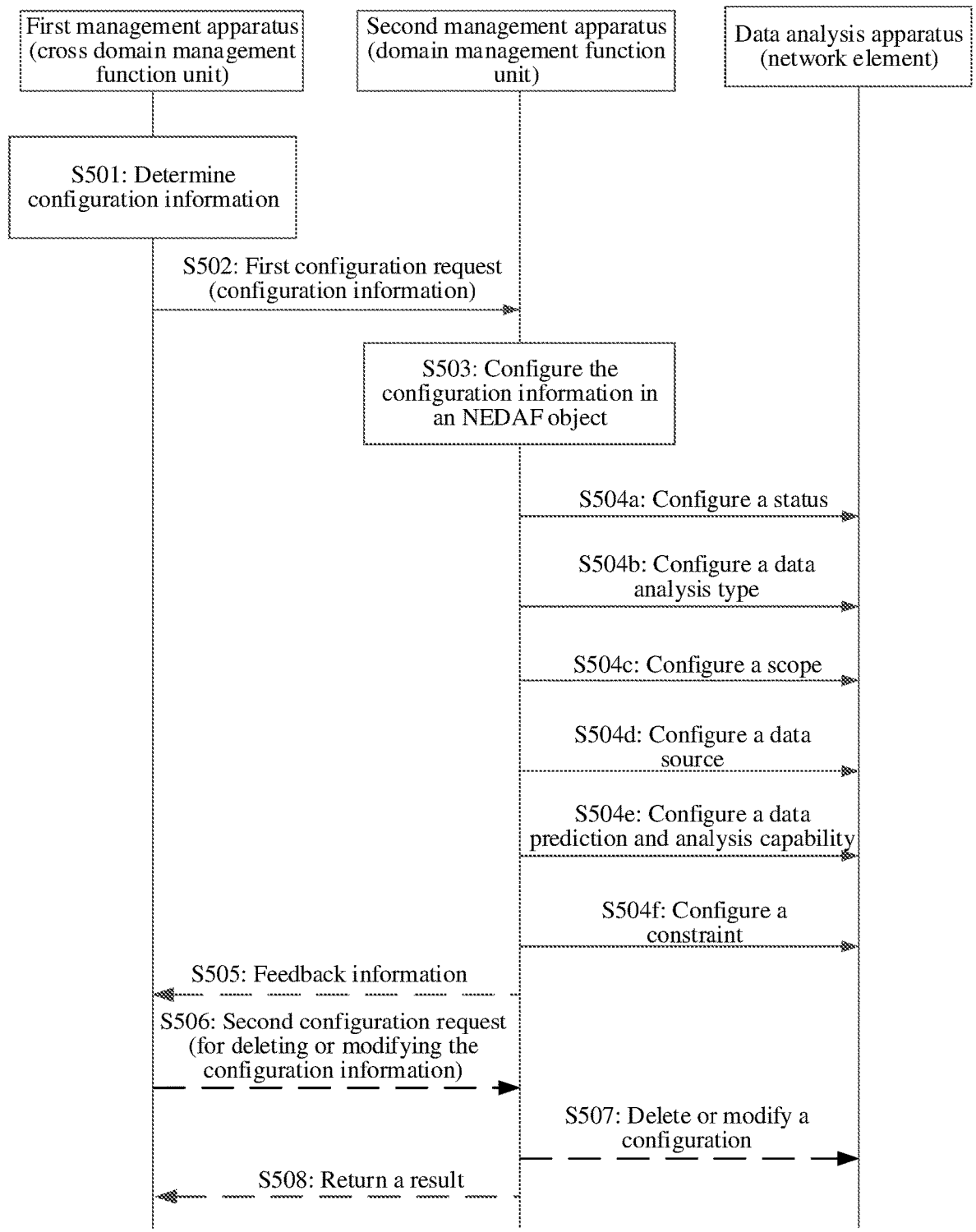
FIG. 5 is another schematic flowchart of a management and control method for a data analysis apparatus according to an embodiment of this application.

Specifically, FIG. 5 is another schematic flowchart of a management and control method for a data analysis apparatus according to an embodiment of this application. As shown in FIG. 5, the procedure includes the following steps.

S501: A cross domain management function unit determines configuration information, where the configuration information is used to configure a data analysis function of a data analysis apparatus.

An implementation principle of S501 is the same as an implementation principle of S201 in the embodiment shown in FIG. 2. Details are not described herein again.

It may be understood that when the data analysis apparatus in FIG. 2 is a network element, the configuration information may have the following meanings: For example, the configuration information includes a plurality of data analysis types (for example, the nine data analysis types listed above), and further includes state information, indicating to activate or de-activate a data analysis function of each of the plurality of data analysis types of the network element. The configuration information further includes prediction capability information, indicating to enable or disable a data prediction and analysis capability of each of the plurality of data analysis types of the network element. The configuration information further includes scope information, indicating scope information of data analysis that is of each of the plurality of data analysis types and that is performed by the network element. The configuration information may further include data source information, indicating a data source of data analysis that is of each of the plurality of data analysis types and that is performed by the network element. The configuration information further includes a constraint, indicating a constraint of data analysis that is of each of the plurality of data analysis types and that is performed by the network element.

After determining the configuration information, the cross domain management function unit may send the configuration information. For a specific sending manner, refer to Manner A and Manner B in S202 in FIG. 2. The following uses Manner A as an example for description. To be specific, the cross domain management function unit configures the data analysis function for the data analysis apparatus by using a domain management function unit. For a specific implementation process, refer to steps S502 to S504. It may be understood that steps S502 to S504 are detailed steps of S202 in FIG. 2.

S502: The cross domain management function unit sends a first configuration request to the domain management function unit, where the first configuration request includes the configuration information, and the first configuration request is used to request the domain management function unit to configure the data analysis function of the data analysis apparatus.

Optionally, the configuration information may be carried in the first configuration request for sending, or may be sent independently of the first configuration request, or the configuration information is used to request the domain management function unit to configure the data analysis function of the data analysis apparatus, e.g., the first configuration request does not need to be sent.

Optionally, the first configuration request may further include an identifier of the data analysis apparatus, which uniquely identifies the data analysis apparatus. FIG. 1 is still used as an example. The domain management function unit is configured to manage one or more network elements, some or all of the network elements may be used as data analysis apparatuses, and specific network elements that may be used as the data analysis apparatuses may be configured in advance (e.g., are known by the cross domain management function unit). Therefore, the first configuration request sent by the cross domain management function unit carries the identifier of the data analysis apparatus (for example, which may be a network element identifier). The identifier may indicate which network element in the domain management function unit is configured as the data analysis apparatus. In this case, the domain management function unit may configure the data analysis function for the network element.

S503: The domain management function unit configures an NEDAF object, and configures the configuration information in the NEDAF object.

"Configuring" the NEDAF object may refer to creating or modifying the NEDAF object (which may also be referred to as a management object of the data analysis function, and a name is not limited in this application). Specifically, if the NEDAF object is not created before S503, "configuration" herein may refer to creation. If the NEDAF object is created before S503, "configuring" herein may refer to modifying the created NEDAF object. The NEDAF object may be simply understood as a database (or a table, a data file, or the like) maintained by the domain management function unit. The database includes the configuration information, and is used to provide the configuration information for the data analysis apparatus. For example, Table 5 shows an example of the NEDAF object maintained by the domain management function unit.

TABLE 5

| | NEDAF object | | |
|---|---|---|---|
| Attribute name | Support qualifier (indicating whether the field is mandatory) | isReadable (indicating whether the field is readable) | isWritable (indicating whether the field is writable) |
| DN | | | |
| State information (NEDAF state) | | | |
| Data analysis type (AnalyticIdList) | | | |
| Scope information (Scope) | | | |
| Data source information (DataSource) | | | |
| Prediction capability information (PredictionCapability) | | | |
| Constraint (Constraint) | | | |

The NEDAF object may be read or written, for example, the configuration information is read from the NEDAF object and sent to the data analysis apparatus, or new configuration information is written into the NEDAF object. For example, the configuration information in the NEDAF object may be updated. For example, when the cross domain management function unit needs to update the configuration information, the cross domain management function unit sends the updated configuration information to the domain management function unit, and the domain management function unit updates the configuration information in the NEDAF object.

S504: The domain management function unit configures the data analysis function of the data analysis apparatus.

That the domain management function unit configures the data analysis function of the data analysis apparatus may be simply understood as that the domain management function unit sends the configuration information to the data analysis apparatus. For example, the domain management function unit may actively send the configuration information to the data analysis apparatus, or may send the configuration information to the data analysis apparatus when receiving a query request sent by the data analysis apparatus, where the query request is used to request to query the configuration information.

Specifically, the domain management function unit may configure information included in the configuration information for the data analysis apparatus one by one. For example, refer to FIG. 5. S504 includes S504*a* to S504*f*. In S504*a*, the domain management function unit configures a status of the data analysis apparatus, for example, activates or de-activates the data analysis function of the data analysis apparatus. S504*b*: The domain management function unit configures a data analysis type of the data analysis apparatus, for example, N data analysis types. S504*c*: The domain management function unit configures a data analysis scope of the data analysis apparatus, for example, performs data analysis in a scope included in a cell list or a network element list. S504*d*: The domain management function unit configures a data source of data analysis performed by the data analysis apparatus, for example, a data source from which data is obtained for analysis and/or a type of data is obtained for analysis. S504*e*: The domain management function unit configures the data prediction and analysis capability of the data analysis apparatus, for example, enables or disables the data prediction and analysis capability of the data analysis apparatus. S504*f*: The domain management function unit configures a constraint of data analysis performed by the data analysis apparatus, for example, a data analysis period and a granularity of data to be analyzed. Specifically, there is no specific execution sequence of S504a to S504f.

After the domain management function unit configures the data analysis function of the network element (e.g., the data analysis apparatus), the domain management function unit or the data analysis apparatus may send feedback information to the cross domain management function unit (e.g., the first management apparatus). For a manner in which the data analysis apparatus sends the feedback information to the first management apparatus, refer to the descriptions of S203 in FIG. 2. Details are not described herein again. The following uses an example in which the domain management function unit sends the feedback information to the cross domain management function unit. Step S505 is specifically included.

S505: The domain management function unit sends the feedback information to the cross domain management function unit, where the feedback information indicates whether a configuration of the data analysis apparatus is completed.

Optionally, S505 may or may not be performed. This is not limited in this embodiment of this application. Therefore, S505 in FIG. 5 is represented by dashed lines.

After the configuration of the data analysis function of the data analysis apparatus is completed, the first management apparatus may further delete or modify the data analysis function configured for the data analysis apparatus. For details, refer to the descriptions of S204 and S205 in FIG. 2. In this example, in FIG. 2, the first management apparatus is the cross domain management function unit and the data analysis apparatus is the network element. Therefore, the cross domain management function unit may delete or modify the data analysis configuration function of the network element in steps S506 to S508. It may be understood that S506 to S508 are detailed steps of S204 and S205 in FIG. 2.

S506: The cross domain management function unit sends a second configuration request to the domain management function unit, where the second configuration request indicates to delete or modify the configuration information.

Optionally, the second configuration information indicates the data analysis apparatus to perform at least one of the following deleting the configuration information; deleting or modifying one or more of the N data analysis types in the configuration information; deleting or modifying the scope information in the configuration information; deleting or modifying the data source information in the configuration information; deleting or modifying the constraint in the configuration information; deleting or modifying the state information in the configuration information; and deleting or modifying the prediction capability information in the configuration information.

Table 1 is used as an example. The cross domain management function unit may delete or modify one or more data analysis types in Table 1, or may delete or modify the scope information in Table 1, or may delete or modify the data source information in Table 1, or may delete or modify the data source information in Table 1, or may delete or modify the constraint in Table 1, or may delete or modify the state information in Table 1, or may delete or modify the prediction capability information in Table 1.

S507: The domain management function unit deletes or modifies the configuration of the data analysis function of the data analysis apparatus.

For example, the second configuration request is used to request to delete the configuration information. The domain management function unit deletes the configuration information in the NEDAF object based on the second configuration request, or deletes the NEDAF object, and indicates the data analysis apparatus to delete the configuration of the data analysis function. Alternatively, for example, the second configuration request includes indication information indicating to modify the scope information and new scope information. The domain management function unit modifies the scope information in the NEDAF object (shown in Table 5), e.g., replaces the scope information with the new scope information, then configures the new scope information for the data analysis apparatus, and may further indicate the data analysis apparatus to delete the original scope information.

S508: The domain management function unit returns a result to the cross domain management function unit, where the result indicates whether deletion or modification of the data analysis function of the data analysis apparatus is completed.

EXAMPLE 2

Figure 6:
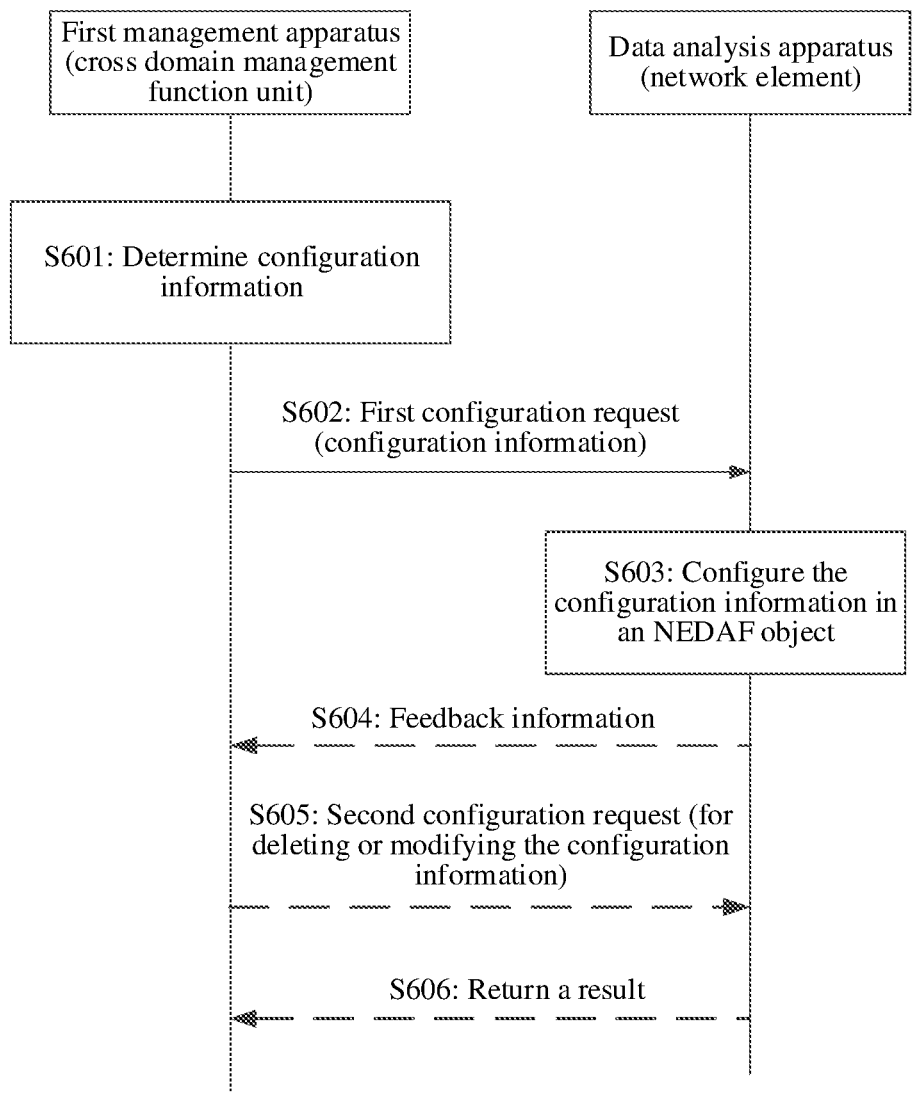
FIG. 6 is another schematic flowchart of a management and control method for a data analysis apparatus according to an embodiment of this application.

In this example, a case in which N>1 is still used as an example. Different from Example 1 in which the first management apparatus is a cross domain management function unit, the data analysis apparatus is a network element, and the first management apparatus configures a data analysis function for the data analysis apparatus by using the second management apparatus (e.g., a domain management function unit), in this example, the first management apparatus (e.g., a cross domain management function unit) may directly configure a data analysis function for the data analysis apparatus (e.g., a network element) without using the second management apparatus (e.g., a domain management function unit). Specifically, FIG. 6 is another schematic flowchart of a management and control method for a data analysis apparatus according to an embodiment of this application. As shown in FIG. 6, the method includes the following steps.

S601: A cross domain management function unit determines configuration information, where the configuration information is used to configure a data analysis function of a data analysis apparatus.

An implementation principle of S601 is the same as an implementation principle of S201 in FIG. 2. Details are not described herein again.

After determining the configuration information, the cross domain management function unit may send the configuration information. For a specific sending manner, refer to Manner A and Manner B in S202 in FIG. 2. The following uses Manner B as an example for description. To be specific, the cross domain management function unit sends the configuration information to the data analysis apparatus (without using a domain management function unit). Details are implemented by using S602. It may be understood that S602 is another detailed step of S202 in FIG. 2.

S602: The cross domain management function unit sends a first configuration request to the data analysis apparatus, where the first configuration request is used to request to configure the data analysis function of the data analysis apparatus, and the first configuration request includes the configuration information.

Optionally, the configuration information may be carried in the first configuration request for sending, or may be sent independently of the first configuration request, or the configuration information is used to request the domain management function unit to configure the data analysis function of the data analysis apparatus, e.g., the first configuration request does not need to be sent.

S603: The data analysis apparatus configures the configuration information in an NEDAF object.

An implementation principle of S603 is similar to an implementation principle of S503 in FIG. 5. Details are not described herein again.

S604: The data analysis apparatus sends feedback information to the cross domain management function unit.

For a manner in which the data analysis apparatus sends the feedback information to the cross domain management function unit, refer to the descriptions of S203 in FIG. 2. Details are not described herein again. Optionally, S604 may or may not be performed. This is not limited in this application. Therefore, S604 is represented by dashed lines in the figure.

S605: The cross domain management function unit sends a second configuration request to the data analysis apparatus, where the second configuration request is used to request deletion or modification of the configuration information.

S606: The data analysis apparatus returns a result to the cross domain management function unit, where the result indicates whether deletion or modification of the configuration information is completed.

Implementation principles of S605 and S606 are similar to implementation principles of S204 and S205 in FIG. 2. Details are not described herein again.

EXAMPLE 3

In Example 1 and Example 2, N>1. In this example, N=1, e.g., the configuration information includes one specific data analysis type. In this case, other information (for example, at least one of prediction capability information, scope information, data source information, and constraint) in the configuration information is only applicable to the specific data analysis type. The specific data analysis type may be one of load information analysis, service experience analysis, network performance analysis, congestion analysis, quality of service analysis, energy saving analysis, traffic steering analysis, MIMO analysis, and UE trajectory analysis.

Figure 7:
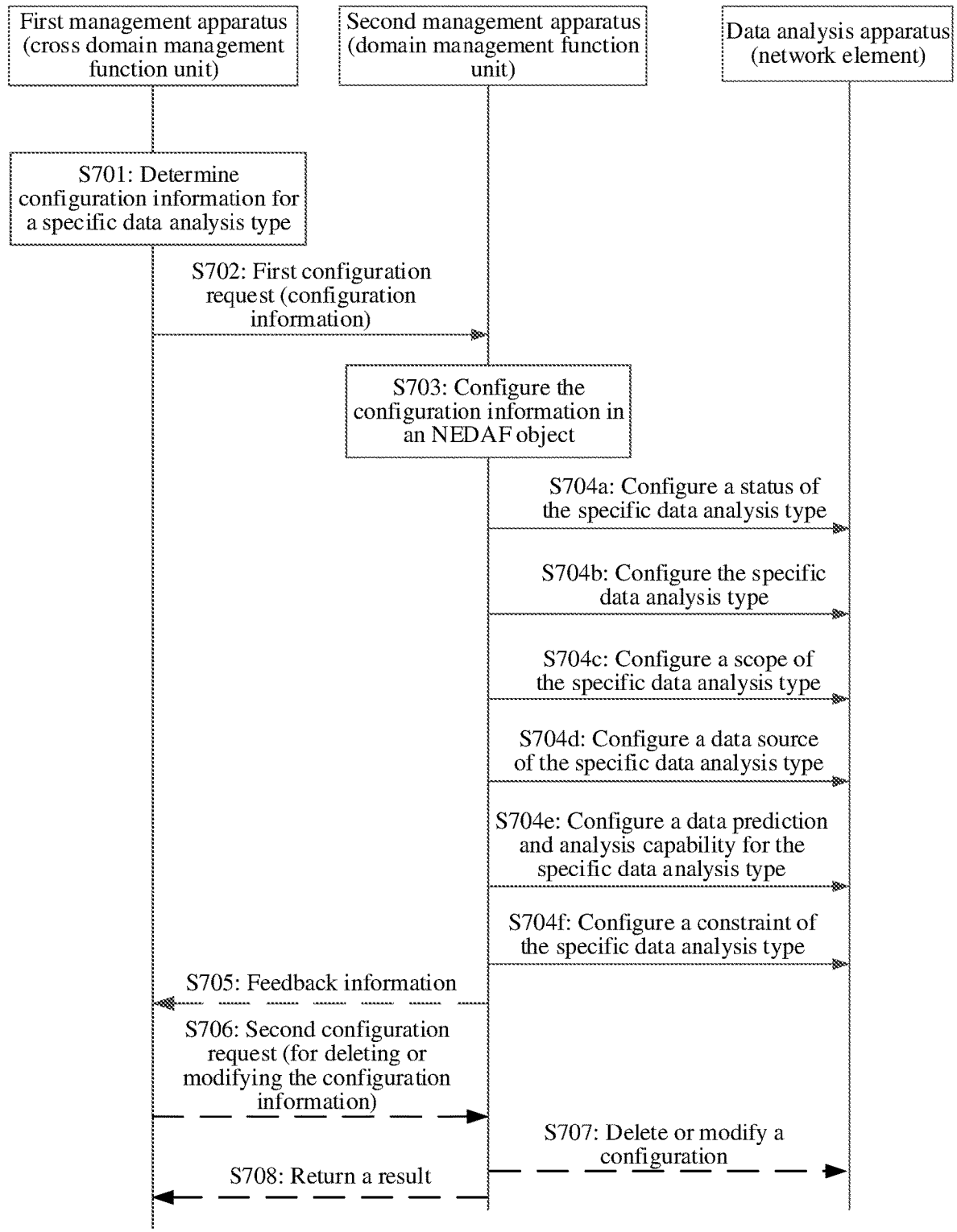
FIG. 7 is another schematic flowchart of a management and control method for a data analysis apparatus according to an embodiment of this application.

FIG. 7 is another schematic flowchart of a management and control method for a data analysis apparatus according to an embodiment of this application. As shown in FIG. 7, the procedure includes the following steps.

S701: A cross domain management function unit determines configuration information, where the configuration information is used to configure a data analysis function of a data analysis apparatus for a specific data analysis type.

The specific data analysis type may be one of load information analysis, service experience analysis, network performance analysis, congestion analysis, quality of service analysis, energy saving analysis, traffic steering analysis, MIMO analysis, and UE trajectory analysis. Specifically, for a process in which the cross domain management function unit determines the configuration information, refer to the case in which N=1 in the embodiment shown in FIG. 2. Details are not described herein again.

After determining the configuration information, the cross domain management function unit may send the configuration information. For a specific sending manner, refer to Manner A and Manner B in S202 in FIG. 2. The following uses Manner A as an example for description. To be specific, the cross domain management function unit configures the data analysis function for the data analysis apparatus by using a domain management function unit. Details are implemented by using S702 to S704. It may be understood that steps S702 to S704 are other detailed steps of S202 in FIG. 2.

S702: The cross domain management function unit sends a first configuration request to the domain management function unit, where the first configuration request includes the configuration information, and the first configuration request is used to request the domain management function unit to configure the data analysis function of the data analysis apparatus.

Optionally, the first configuration request may further include an identifier of the data analysis apparatus, which uniquely indicates the data analysis apparatus.

S703: The domain management function unit configures an NEDAF object, and configures the configuration information in the NEDAF object.

"Configuring" the NEDAF object may refer to creating or modifying the NEDAF object. This may be simply understood as that the domain management function unit maintains a database (or a table, a data file, or the like). The database includes the configuration information, and is used to provide the configuration information for the data analysis apparatus. For example, Table 6 shows an example of the NEDAF object maintained by the domain management function unit.

TABLE 6

| | NEDAF object | | |
|---|---|---|---|
| Attribute name | Support qualifier (indicating whether the field is mandatory) | isReadable (indicating whether the field is readable) | isWritable (indicating whether the field is writable) |
| Id | | | |
| State information (State) | | | |
| Data analysis type (AnalyticType) | | | |
| Scope information (Scope) | | | |
| Data source information (DataSource) | | | |
| Prediction capability information (PredictionCapability) | | | |
| Constraint (Constraint) | | | |

The NEDAF object may be read or written, for example, the configuration information is read from the NEDAF object and sent to the data analysis apparatus, or the configuration information is written into the NEDAF object.

S704: The domain management function unit configures the data analysis function of the data analysis apparatus for the specific data analysis type.

For example, the domain management function unit may actively send the configuration information to the data analysis apparatus, or may send the configuration information to the data analysis apparatus when receiving a query request sent by the data analysis apparatus, where the query request is used to request to query the configuration information.

Specifically, the domain management function unit may configure information included in the configuration information one by one for the data analysis apparatus. For example, refer to FIG. 7. S704 includes S704a to S704f. In S704a, the domain management function unit configures a status of the data analysis apparatus for the specific data analysis type, for example, activates or de-activates the data analysis function of the data analysis apparatus for the specific data analysis type. S704b: The domain management function unit configures a data analysis type of the data analysis apparatus, where the data analysis type indicates the specific data analysis type. S704c: The domain management function unit configures a data analysis scope of the data analysis apparatus, where the data analysis scope indicates a data scope of analysis of the specific data analysis type. S704d: The domain management function unit configures a data source of data analysis performed by the data analysis apparatus, where the data source indicates a data source of analysis of the specific data analysis type. S704e: The domain management function unit configures a data prediction and analysis capability of the data analysis apparatus, where the data prediction and analysis capability indicates to enable or disable a data prediction capability for the specific data analysis type. S704f: The domain management function unit configures a constraint of data analysis performed by the data analysis apparatus, where the constraint indicates a constraint of analysis of the specific data analysis type.

S705: The domain management function unit sends feedback information to the cross domain management function unit, where the feedback information indicates whether a configuration of the data analysis apparatus is completed.

Optionally, S705 may or may not be performed. This is not limited in this embodiment of this application. Therefore, S705 is represented by dashed lines in the figure.

After the data analysis apparatus completes the configuration of the data analysis function for the specific data analysis type, the first management apparatus may further delete or modify the data analysis function of the data analysis apparatus for the specific data analysis type. For details, refer to the descriptions of S204 and S205 in FIG. 2. In this example, in FIG. 2, the first management apparatus is a cross domain management function unit and the data analysis apparatus is a domain management function unit. Therefore, the cross domain management function unit may implement deletion or modification of a data analysis function of a network element for a specific data analysis type in S706 to S708. It may be understood that S706 to S708 are other detailed steps of S204 and S205 in FIG. 2.

S706: The cross domain management function unit sends a second configuration request to the domain management function unit, where the second configuration request indicates to delete or modify the data analysis function of the data analysis apparatus for the specific data analysis type.

It may be understood that, before S706, the method may further include a step: The cross domain management function unit determines that the data analysis function of the data analysis apparatus for the specific data analysis type needs to be deleted or modified. This step is not shown in FIG. 7.

Optionally, the second configuration information indicates the data analysis apparatus to perform at least one of the following: deleting the configuration information; deleting or modifying the specific data analysis type in the configuration information; deleting or modifying the scope information in the configuration information; deleting or modifying the data source information in the configuration information; deleting or modifying the constraint in the configuration information; deleting or modifying the state information in the configuration information; and deleting or modifying the prediction capability information in the configuration information.

S707: The domain management function unit deletes or modifies the data analysis function of the data analysis apparatus for the specific data analysis type.

For example, if the second configuration request is used to request to delete the configuration information, the domain management function unit deletes the configuration information in the NEDAF object, or deletes the NEDAF object, and indicates the data analysis apparatus to cancel the data analysis function for the specific data analysis type. Alternatively, if the second configuration request includes indication information indicating to modify the scope information and new scope information, the domain management function unit replaces the scope information in the NEDAF object (shown in Table 6) with the new scope information, then configures the new scope information for the data analysis apparatus, and may further indicate the data analysis apparatus to delete the original scope information. In this case, the data analysis apparatus uses the updated scope information during analysis of the specific data analysis type.

S708: The domain management function unit returns a result to the cross domain management function unit, where the result indicates whether deletion or modification of the data analysis function of the data analysis apparatus for the specific data analysis type succeeds.

EXAMPLE 4

Figure 8:
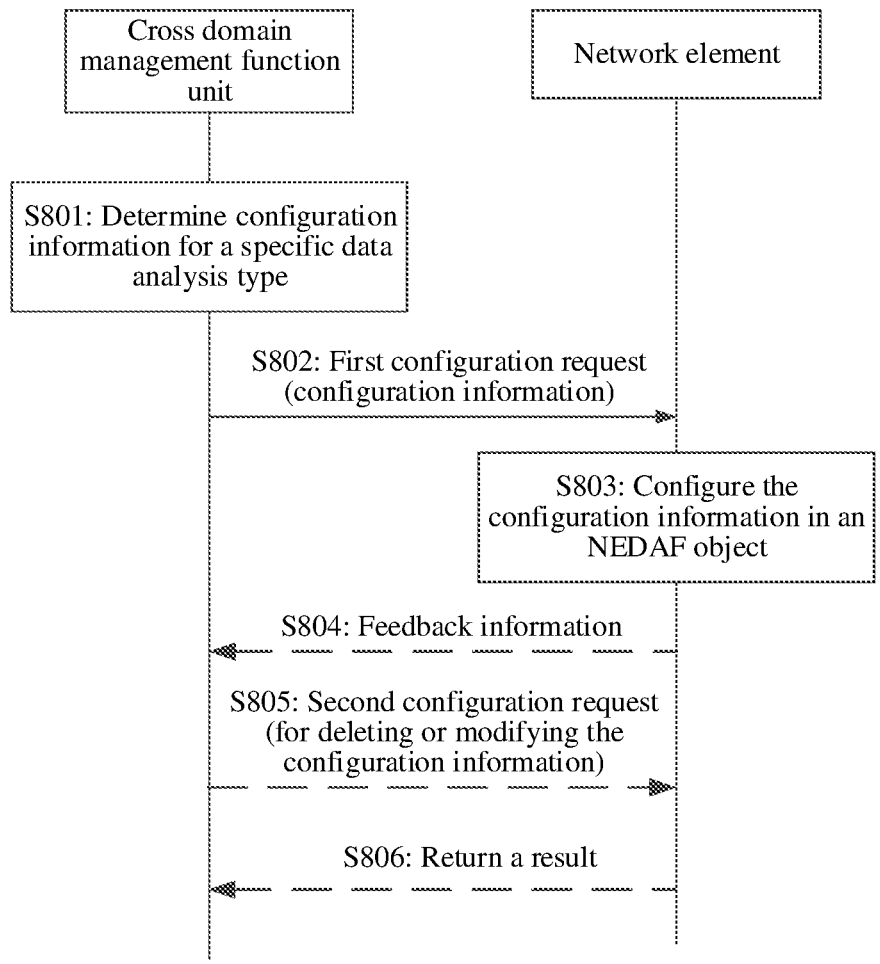
FIG. 8 is another schematic flowchart of a management and control method for a data analysis apparatus according to an embodiment of this application.

In this example, a case in which N=1 is still used as an example. In Example 3, the first management apparatus is a cross domain management function unit, the data analysis apparatus is a network element, and the first management apparatus configures a data analysis function for a specific data analysis type for the data analysis apparatus by using the second management apparatus (e.g., a domain management function unit). Different from Example 3, in this example, the first management apparatus (e.g., a cross domain management function unit) may directly configure a data analysis function for a specific data analysis type for the data analysis apparatus (e.g., a network element), without using the second management apparatus (e.g., a domain management function unit). Specifically, FIG. 8 is another schematic flowchart of a management and control method for a data analysis apparatus according to an embodiment of this application. As shown in FIG. 8, the method includes the following steps.

S801: A cross domain management function unit determines configuration information, where the configuration information is used to configure a data analysis function of a data analysis apparatus for a specific data analysis type.

An implementation principle of S801 is the same as an implementation principle of S701. Details are not described herein again.

After determining the configuration information, the cross domain management function unit may send the configuration information. For a specific sending manner, refer to Manner A and Manner B in S202 in FIG. 2. The following uses Manner B as an example for description. To be specific, the cross domain management function unit sends the configuration information to the data analysis apparatus (without using a domain management function unit). Details are implemented by using step S802. It may be understood that step S802 is another detailed step of S202 in FIG. 2.

S802: The cross domain management function unit sends a first configuration request to the data analysis apparatus, where the first configuration request is used to request to configure the data analysis function of the data analysis apparatus, and the first configuration request includes the configuration information.

Optionally, the configuration information may be carried in the first configuration request for sending, or may be sent independently of the first configuration request, or the configuration information is used to request the domain management function unit to configure the data analysis function of the data analysis apparatus, e.g., the first configuration request does not need to be sent.

S803: The data analysis apparatus configures the configuration information in an NEDAF object.

An implementation principle of S803 is similar to an implementation principle of S503 in FIG. 5. Details are not described herein again.

S804: The data analysis apparatus sends feedback information to the cross domain management function unit.

For a manner in which the data analysis apparatus sends the feedback information to the cross domain management function unit, refer to the descriptions of S203 in FIG. 2. Details are not described herein again. Optionally, S804 may or may not be performed. This is not limited in this application. Therefore, S804 is represented by dashed lines in FIG. 8.

S805: The cross domain management function unit sends a second configuration request to the data analysis apparatus, where the second configuration request is used to request deletion or modification of the configuration information.

S806: The data analysis apparatus returns a result to the cross domain management function unit, where the result indicates whether deletion or modification of the configuration information is completed.

Implementation principles of S805 and S806 are similar to implementation principles of S204 and S205 in FIG. 2. Details are not described herein again.

The following describes, with reference to the accompanying drawings, apparatuses used to implement the foregoing methods in embodiments of this application. Therefore, all the foregoing content may be used in the following embodiments, and repeated content is not described again.

Figure 9:
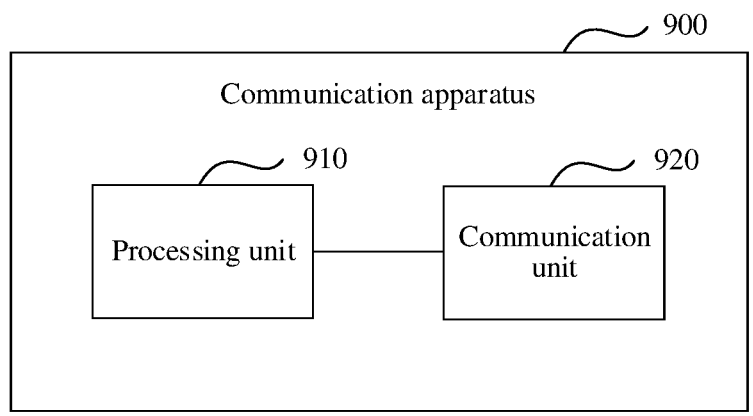
FIG. 9 is a schematic diagram of a communication apparatus according to an embodiment of this application.

FIG. 9 is a structural block diagram of a communication apparatus 900 according to an embodiment of this application. For example, the communication apparatus 900 is, for example, the first management apparatus, the second management apparatus, or the data analysis apparatus. The communication apparatus 900 includes a processing unit 910 and a communication unit 920.

In an example, the communication apparatus 900 is the first management apparatus, or an apparatus that can support the first management apparatus in implementing functions required by the method, for example, a chip system. For example, the first management apparatus is a service operation unit, a cross domain management function unit, or a domain management function unit.

The processing unit 910 may be configured to: perform all operations performed by the first management apparatus except the receiving and sending operations in the embodiments shown in FIG. 5 to FIG. 8, and/or support another process of the technology described in this specification. The communication unit 920 may be configured to: perform all the receiving and sending operations performed by the first management apparatus in the embodiments shown in FIG. 5 to FIG. 8, and/or support another process of the technology described in this specification.

The communication unit 920 may be a functional module, and the functional module can complete both the sending operation and the receiving operation. For example, the communication unit 920 is a module included in the communication apparatus 900. In this case, the communication unit 920 may be configured to perform all the sending operations and receiving operations performed by the first management apparatus in the embodiments shown in FIG. 5 to FIG. 8. For example, when the sending operation is performed, it may be considered that the communication unit 920 is a sending module, and when the receiving operation is performed, it may be considered that the communication unit 920 is a receiving module. Alternatively, the communication unit 920 may be a collective term of two functional modules. The two functional modules are respectively a sending module and a receiving module. The sending module is configured to complete the sending operation. For example, the communication unit 920 is a module included in the communication apparatus. In this case, the sending module may be configured to perform all the sending operations performed by the first management apparatus in the embodiments shown in FIG. 5 to FIG. 8. The receiving module is configured to complete the receiving operation. For example, the communication unit 920 is a module included in the first management apparatus. In this case, the receiving module may be configured to perform all the receiving operations performed by the first management apparatus in the embodiments shown in FIG. 5 to FIG. 8.

For example, the processing unit 910 is configured to determine configuration information of a data analysis apparatus, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The communication unit 920 is configured to send the configuration information.

In an example, the communication apparatus 900 is the data analysis apparatus, or an apparatus that can support the data analysis apparatus in implementing functions required by the method, for example, a chip system. The processing unit 910 may be configured to: perform all operations performed by the data analysis apparatus except the receiving and sending operations in the embodiments shown in FIG. 5 to FIG. 8, and/or support another process of the technology described in this specification. The communication unit 920 may be configured to: perform all the receiving and sending operations performed by the data analysis apparatus in the embodiments shown in FIG. 5 to FIG. 8, and/or support another process of the technology described in this specification.

The communication unit 920 may be a functional module, and the functional module can complete both the sending operation and the receiving operation. For example, the communication unit 920 is a module included in the data analysis apparatus. In this case, the communication unit 920 may be configured to perform all the sending operations and receiving operations performed by the data analysis apparatus in the embodiments shown in FIG. 5 to FIG. 8. For example, when the sending operation is performed, it may be considered that the communication unit 920 is a sending module, and when the receiving operation is performed, it may be considered that the communication unit 920 is a receiving module. Alternatively, the communication unit 920 may be a collective term of two functional modules. The two functional modules are respectively a sending module and a receiving module. The sending module is configured to complete the sending operation. For example, the communication unit 920 is a module included in the data analysis apparatus. In this case, the sending module may be configured to perform all the sending operations performed by the data analysis apparatus in the embodiments shown in FIG. 5 to FIG. 8. The receiving module is configured to complete the receiving operation. For example, the communication unit 920 is a module included in the data analysis apparatus. In this case, the receiving module may be configured to perform all the receiving operations performed by the data analysis apparatus in the embodiments shown in FIG. 5 to FIG. 8.

For example, the communication unit 920 is configured to receive configuration information, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The processing unit 910 is configured to perform data analysis based on the configuration information.

In an example, the communication apparatus 900 is the second management apparatus, or an apparatus that can support the second management apparatus in implementing functions required by the method, for example, a chip system. The processing unit 910 may be configured to: perform all operations performed by the second management apparatus except the receiving and sending operations in the embodiments shown in FIG. 5 to FIG. 8, and/or support another process of the technology described in this specification. The communication unit 920 may be configured to: perform all the receiving and sending operations performed by the second management apparatus in the embodiments shown in FIG. 5 to FIG. 8, and/or support another process of the technology described in this specification.

The communication unit 920 may be a functional module, and the functional module can complete both the sending operation and the receiving operation. For example, the communication unit 920 is a module included in the second management apparatus. In this case, the communication unit 920 may be configured to perform all the sending operations and receiving operations performed by the second management apparatus in the embodiments shown in FIG. 5 to FIG. 8. For example, when the sending operation is performed, it may be considered that the communication unit 920 is a sending module, and when the receiving operation is performed, it may be considered that the communication unit 920 is a receiving module. Alternatively, the communication unit 920 may be a collective term of two functional modules. The two functional modules are respectively a sending module and a receiving module. The sending module is configured to complete the sending operation. For example, the communication unit 920 is a module included in the second management apparatus. In this case, the sending module may be configured to perform all the sending operations performed by the second management apparatus in the embodiments shown in FIG. 5 to FIG. 8. The receiving module is configured to complete the receiving operation. For example, the communication unit 920 is a module included in the second management apparatus. In this case, the receiving module may be configured to perform all the receiving operations performed by the second management apparatus in the embodiments shown in FIG. 5 to FIG. 8.

For example, the communication unit 920 is configured to receive a first configuration request sent by a first management apparatus, where the first management apparatus is configured to manage the second management apparatus, the first configuration request includes configuration information, the configuration information is used to configure a data analysis function of a data analysis apparatus, the data analysis apparatus is an apparatus managed by the second management apparatus, and the configuration information includes at least one of the following: state information, used to activate or de-activate the data analysis function of the data analysis apparatus; and prediction capability information, used to configure a data prediction and analysis capability of the data analysis apparatus. The communication unit 920 is further configured to send the configuration information to the data analysis apparatus.

Division into the units in embodiments of this application is an example and is merely logical function division, and may be other division in an actual implementation. In addition, functional units in embodiments of this application may be integrated into one processor, and each of the units may exist alone physically, or two or more units may be integrated into one module. The integrated unit may be implemented in a form of hardware, or may be implemented in a form of a software functional unit.

One or more units may exist in FIG. 9, and may be implemented by software, hardware, firmware, or a combination thereof. The software or the firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 10:
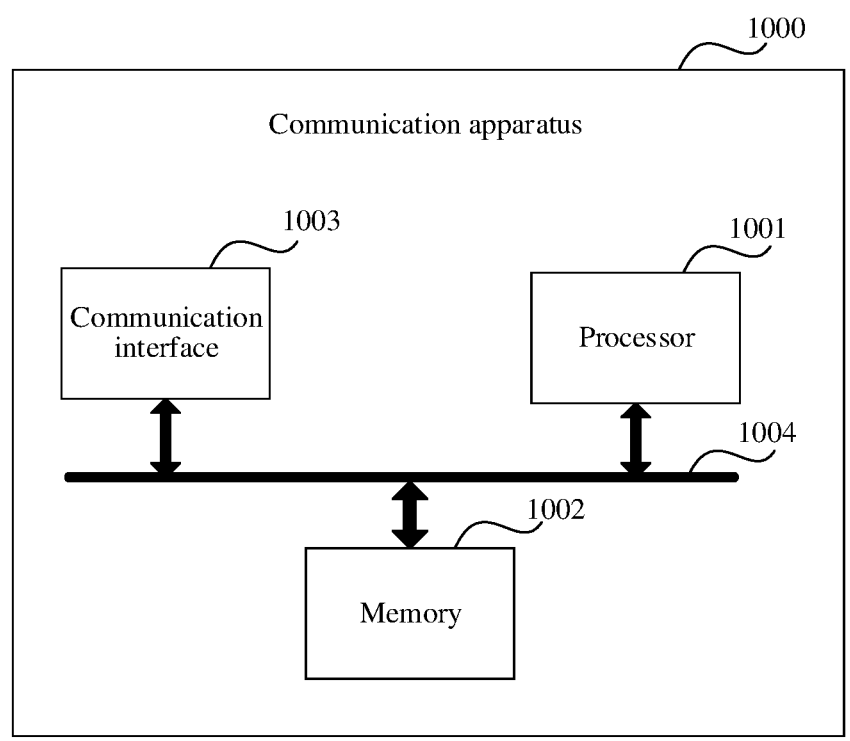
FIG. 10 is another schematic diagram of a communication apparatus according to an embodiment of this application.

FIG. 10 is a schematic diagram of hardware of a communication apparatus woo according to an embodiment of this application. The communication apparatus moo includes at least one processor 1001, and further includes at least one memory 1002, configured to store program instructions and/or data. The memory 1002 is coupled to the processor 1001. The coupling in this embodiment of this application may be indirect coupling or a communication connection between apparatuses, units, or modules in an electrical form, a mechanical form, or another form, and is used for information exchange between the apparatuses, the units, or the modules. The processor 1001 may cooperate with the memory 1002, the processor 1001 may execute the program instructions stored in the memory 1002, and at least one of the at least one memory 1002 may be included in the processor 1001.

The communication apparatus woo may further include a communication interface 1003, configured to communicate with another device through a transmission medium, so that the communication apparatus woo can communicate with the another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter. Alternatively, a transceiver with a transceiver function, an interface circuit, or the like may be integrated.

It should be understood that a connection medium between the processor low, the memory 1002, and the communication interface 1003 is not limited in this embodiment of this application. In this embodiment of this application, the memory 1002, the processor low, and the communication interface 1003 are connected through a communication bus 1004 in FIG. 10. The bus is represented by a thick line in FIG. 10. A manner of a connection between other components is merely an example for description, and is not limited. The bus may include an address bus, a data bus, a control bus, and the like. For ease of representation, only one thick line is used in FIG. 10 for representation, but this does not mean that there is only one bus, only one type of bus, or the like.

In an example, the communication apparatus woo is configured to implement steps performed by the first management apparatus in the foregoing procedures shown in FIG. 5 to FIG. 8. The communication apparatus woo may be the first management apparatus, or a chip or a circuit in the first management apparatus. The communication interface 1003 is configured to perform the receiving and sending operations of the first management apparatus in the foregoing embodiments. The processor 1001 is configured to perform processing-related operations of the first management apparatus in the foregoing method embodiments.

For example, the processor 1001 is configured to determine configuration information of a data analysis apparatus, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The communication interface 1003 is configured to send the configuration information.

In an example, the communication apparatus moo is configured to implement steps performed by the data analysis apparatus in the foregoing procedures shown in FIG. 5 to FIG. 8. The communication apparatus woo may be the data analysis apparatus, or a chip or a circuit in the data analysis apparatus. The communication interface 1003 is configured to perform receiving and sending-related operations on the side of the data analysis apparatus in the foregoing embodiments. The processor 1001 is configured to perform processing-related operations on the side of the data analysis apparatus in the foregoing method embodiments.

For example, the communication interface 1003 is configured to receive configuration information, where the configuration information is used to configure a data analysis function of the data analysis apparatus, and the configuration information includes at least one of the following: state information, used to activate or de-activate the data analysis function of the data analysis apparatus; and prediction capability information, used to configure a data prediction and analysis capability of the data analysis apparatus. The processor 1001 is configured to perform data analysis based on the configuration information.

In an example, the communication apparatus woo is configured to implement steps performed by the second management apparatus in the foregoing procedures shown in FIG. 5 to FIG. 8. The communication apparatus woo may be the second management apparatus, or a chip or a circuit in the second management apparatus. The communication interface 1003 is configured to perform the receiving and sending-related operations on the side of the second management apparatus in the foregoing embodiments. The processor 1001 is configured to perform processing-related operations on the side of the second management apparatus in the foregoing method embodiments.

For example, the communication interface 1003 is configured to receive a first configuration request sent by a first management apparatus, where the first management apparatus is configured to manage the second management apparatus, the first configuration request includes configuration information, the configuration information is used to configure a data analysis function of a data analysis apparatus, the data analysis apparatus is an apparatus managed by the second management apparatus, and the configuration information includes at least one of the following: state information, used to activate or de-activate the data analysis function of the data analysis apparatus; and prediction capability information, used to configure a data prediction and analysis capability of the data analysis apparatus. The communication interface 1003 is further configured to send the configuration information to the data analysis apparatus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In embodiments of this application, the memory may be a nonvolatile memory, such as a hard disk drive (HDD) or a solid-state drive (SSD), or may be a volatile memory, such as a random access memory (random access memory, RAM). The memory is any other medium that can be used to carry or store expected program code in a form of instructions or a data structure and that is accessible by a computer, but is not limited thereto. The memory in embodiments of this application may alternatively be a circuit or any other apparatus that can implement a storage function, and is configured to store program instructions and/or data.

All or some of the methods provided in embodiments of this application may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that, a person skilled in the art can make various modifications and variations to this application without departing from the scope of this application. In this way, this application is intended to cover these modifications and variations of this application provided that they fall within the scope of the claims of this application and their equivalent technologies.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may represent a, b, c, a and b, a and c, b and c, or a, b, and c, where a, b, and c may be one or more.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more procedures in the flowcharts and/or in one or more blocks in the block diagrams.

The computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more procedures in the flowcharts and/or in one or more blocks in the block diagrams.

In the several embodiments provided in this application, it should be understood that the disclosed apparatus and method may be implemented in other manners without departing from the scope of this application. For example, the described embodiment is merely an example. For example, division into the modules or the units is merely logical function division and may be other division in an actual implementation. For example, a plurality of units or components may be combined or integrated into another system, or some features may be ignored or not performed. The units described as separate parts may or may not be physically separate, and parts displayed as units may or may not be physical units, and may be located in one position, or may be distributed on a plurality of network units. Some or all of the modules may be selected based on actual requirements to achieve the objectives of the solutions of embodiments. A person of ordinary skill in the art may understand and implement embodiments of the present invention without creative efforts.

In addition, the described apparatus and method and schematic diagrams of different embodiments may be combined or integrated with other systems, modules, technologies, or methods without departing from the scope of the application. In addition, the displayed or discussed mutual couplings or direct couplings or communication connection may be implemented through some interfaces. The indirect couplings or communication connections between the apparatuses or units may be implemented in electronic, mechanic, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method, comprising:
determining, by one or more processors of a first management apparatus, configuration information of a data analysis apparatus, wherein a data analysis function of the data analysis apparatus is configured with the configuration information, and the configuration information comprises:

state information to activate or de-activate the data analysis function of the data analysis apparatus, wherein the data analysis apparatus activates or de-activates the data analysis function of the data analysis apparatus in response to receiving the state information;

scope information indicating a scope of data analysis to be performed by the data analysis apparatus; and N data analysis types, wherein each of the N data analysis types indicates an analysis type of data analysis performed by the data analysis apparatus, and N is an integer greater than or equal to 1, wherein the state information indicates to activate or de-activate a corresponding data analysis function of each of the N data analysis types; and sending, by the one or more processors of the first management apparatus, the configuration information.

2. The method according to claim 1, wherein the configuration information further comprises:

data source information indicating a data source of data analysis performed by the data analysis apparatus; or a constraint indicating a constraint of data analysis performed by the data analysis apparatus.

3. The method according to claim 2, wherein the N data analysis types comprise:

load data analysis, service experience data analysis, network performance data analysis, congestion data analysis, QoS data analysis, energy saving data analysis, traffic steering data analysis, MIMO data analysis, or UE trajectory data analysis.

4. The method according to claim 1, wherein the scope information comprises:

a network element list indicating the data analysis apparatus to analyze data of a network element in the network element list;

a tracking area code list indicating the data analysis apparatus to analyze data of a tracking area code in the tracking area code list;

a cell list indicating the data analysis apparatus to analyze data of a cell in the cell list;

a network slice list indicating the data analysis apparatus to analyze data of a network slice in the network slice list; or a geographical area indicating the data analysis apparatus to analyze data in the geographical area.

5. The method according to claim 1, wherein sending the configuration information comprises:

sending a first configuration request to a second management apparatus, wherein the first configuration request comprises the configuration information, and the first configuration request requests the second management apparatus to configure the data analysis function of the data analysis apparatus; or sending the configuration information to the data analysis apparatus.

6. A method, comprising:

receiving, by one or more processors of a receiving end apparatus, configuration information, wherein a data analysis function of a data analysis apparatus is configured with the configuration information, and the configuration information comprises:

state information to activate or de-activate the data analysis function of the data analysis apparatus, wherein the data analysis apparatus activates or de-activates the data analysis function of the data analysis apparatus in response to receiving the state information;

scope information indicating a scope of data analysis performed by the data analysis apparatus; and N data analysis types, wherein each of the N data analysis types indicates an analysis type of data analysis performed by the data analysis apparatus, and N is an integer greater than or equal to 1, wherein the state information indicates to activate or de-activate a corresponding data analysis function of each of the N data analysis types; and when the receiving end apparatus is the data analysis apparatus, performing data analysis based on the configuration information; or when the receiving end apparatus is a second management apparatus, sending the configuration information to the data analysis apparatus, wherein the second management apparatus is an apparatus managing the data analysis apparatus.

7. The method according to claim 6, wherein the configuration information further comprises:

data source information indicating a data source of data analysis performed by the data analysis apparatus; or a constraint indicating a constraint of data analysis performed by the data analysis apparatus.

8. The method according to claim 6, wherein the N data analysis types comprise:

load data analysis, service experience data analysis, network performance data analysis, congestion data analysis, QoS data analysis, energy saving data analysis, traffic steering data analysis, MIMO data analysis, or UE trajectory data analysis.

9. The method according to claim 6, wherein the scope information comprises:

a network element list indicating the data analysis apparatus to analyze data of a network element in the network element list;

a tracking area code list indicating the data analysis apparatus to analyze data of a tracking area code in the tracking area code list;

a cell list indicating the data analysis apparatus to analyze data of a cell in the cell list;

a network slice list indicating the data analysis apparatus to analyze data of a network slice in the network slice list; or a geographical area indicating the data analysis apparatus to analyze data in the geographical area.

10. The method according to claim 6, wherein:

when the receiving end apparatus is the second management apparatus, receiving configuration information comprises: receiving a first configuration request from a first management apparatus, wherein the first configuration request comprises the configuration information, and the configuration information requests the second management apparatus to configure the data analysis function of the data analysis apparatus; or when the receiving end apparatus is the data analysis apparatus, receiving configuration information comprises: receiving the configuration information from the first management apparatus or the second management apparatus.

11. A communication apparatus, comprising:

at least one processor; and a non-transitory memory storing program instructions, wherein when the program instructions are executed by the at least one processor, the communication apparatus is enabled to perform the steps of:

determining configuration information of a data analysis apparatus, wherein a data analysis function of the data analysis apparatus is configured with the configuration information, and the configuration information comprises:
- state information to activate or de-activate the data analysis function of the data analysis apparatus;
- scope information indicating a scope of data analysis performed by the data analysis apparatus; and
- N data analysis types, wherein each of the N data analysis types indicates an analysis type of data analysis performed by the data analysis apparatus, and N is an integer greater than or equal to 1, wherein the state information indicates to activate or de-activate a corresponding data analysis function of each of the N data analysis types; and
- sending the configuration information, wherein the data analysis apparatus activates or de-activates the data analysis function of the data analysis apparatus in response to receiving the state information.

12. The communication apparatus according to claim 11, wherein the configuration information further comprises:
- data source information indicating a data source of data analysis performed by the data analysis apparatus; or
- a constraint indicating a constraint of data analysis performed by the data analysis apparatus.

13. The communication apparatus according to claim 11, wherein the N data analysis types comprises:
- load data analysis, service experience data analysis, network performance data analysis, congestion data analysis, QoS data analysis, energy saving data analysis, traffic steering data analysis, MIMO data analysis, or UE trajectory data analysis.

14. The communication apparatus according to claim 11, wherein the scope information comprises:
- a network element list indicating the data analysis apparatus to analyze data of a network element in the network element list;
- a tracking area code list indicating the data analysis apparatus to analyze data of a tracking area code in the tracking area code list;
- a cell list indicating the data analysis apparatus to analyze data of a cell in the cell list;
- a network slice list indicating the data analysis apparatus to analyze data of a network slice in the network slice list; or
- a geographical area indicating the data analysis apparatus to analyze data in the geographical area.

15. A communication apparatus, comprising:
- at least one processor; and
- a non-transitory memory storing program instructions, wherein when the program instructions are executed by the at least one processor, the communication apparatus is enabled to perform the steps of:
  - receive configuration information, wherein a data analysis function of a data analysis apparatus is configured with the configuration information, and the configuration information comprises:
    - state information to activate or de-activate the data analysis function of the data analysis apparatus, wherein the data analysis apparatus activates or de-activates the data analysis function of the data analysis apparatus in response to receiving the state information;
    - scope information indicating a scope of data analysis performed by the data analysis apparatus; and
    - N data analysis types, wherein each of the N data analysis types indicates an analysis type of data analysis performed by the data analysis apparatus, and N is an integer greater than or equal to 1, wherein the state information indicates to activate or de-activate a corresponding data analysis function of each of the N data analysis types; and
  - when the communication apparatus is the data analysis apparatus, performing data analysis based on the configuration information; or
  - when the communication apparatus is a second management apparatus, sending the configuration information to the data analysis apparatus, wherein the second management apparatus is an apparatus managing the data analysis apparatus.

16. The communication apparatus according to claim 15, wherein the configuration information further comprises:
- data source information indicating a data source of data analysis performed by the data analysis apparatus; or
- a constraint indicating a constraint of data analysis performed by the data analysis apparatus.

17. The communication apparatus according to claim 15, wherein the N data analysis types comprise:
- load data analysis, service experience data analysis, network performance data analysis, congestion data analysis, QoS data analysis, energy saving data analysis, traffic steering data analysis, MIMO data analysis, or UE trajectory data analysis.

18. The communication apparatus according to claim 15, wherein the scope information comprises:
- a network element list indicating the data analysis apparatus to analyze data of a network element in the network element list;
- a tracking area code list indicating the data analysis apparatus to analyze data of a tracking area code in the tracking area code list;
- a cell list indicating the data analysis apparatus to analyze data of a cell in the cell list;
- a network slice list indicating the data analysis apparatus to analyze data of a network slice in the network slice list; or
- a geographical area indicating the data analysis apparatus to analyze data in the geographical area.

19. The method according to claim 1, wherein the N data analysis types includes a first data analysis type and a second data analysis type that is different from the first data analysis type, wherein the state information includes first state information and second state information that is different from the first state information, wherein the first state information indicates to activate or de-activate a data analysis function of the first data analysis type, and wherein the second state information indicates to activate or de-activate a data analysis function of the second data analysis type.

* * * * *

UNITED STATES PATENT AND TRADEMARK OFFICE
CERTIFICATE OF CORRECTION

PATENT NO. : 12,273,251 B2
APPLICATION NO. : 18/351717
DATED : April 8, 2025
INVENTOR(S) : Xu et al.

Page 1 of 1

It is certified that error appears in the above-identified patent and that said Letters Patent is hereby corrected as shown below:

In the Claims

In Column 52, in Claim 6, Lines 13-17, delete "when the receiving end apparatus is a second management apparatus, sending the configuration information to the data analysis apparatus, wherein the second management apparatus is an apparatus managing the data analysis apparatus." and insert the same from Line 14 as new point/paragraph.

Signed and Sealed this
Third Day of June, 2025

Coke Morgan Stewart
*Acting Director of the United States Patent and Trademark Office*